US005673077A

United States Patent [19]

Kawakami et al.

[11] Patent Number: 5,673,077

[45] Date of Patent: Sep. 30, 1997

[54] PROCESS OF FORMING A TRANSFER-IMAGE OF ABLATION TYPE IMAGE-TRANSFER RECORDING MATERIAL

[75] Inventors: Sota Kawakami; Atsushi Nakajima, both of Hino, Japan

[73] Assignee: Konica Corporation, Tokyo, Japan

[21] Appl. No.: 306,145

[22] Filed: Sep. 14, 1994

[30] Foreign Application Priority Data

Sep. 16, 1993 [JP] Japan .................................... 5-230482

[51] Int. Cl.[6] ................................ B41J 2/355; B41J 2/47; G01D 15/10; G01D 15/16

[52] U.S. Cl. ........................... 347/183; 347/251; 358/299

[58] Field of Search ..................................... 347/183, 251; 503/200; 358/299

[56] References Cited

U.S. PATENT DOCUMENTS

| | | | |
|---|---|---|---|
| 4,001,840 | 1/1977 | Becker et al. | 347/259 |
| 4,596,993 | 6/1986 | Erlichman | 347/183 |
| 5,236,883 | 8/1993 | Nakazawa et al. | 503/200 |

FOREIGN PATENT DOCUMENTS

| | | |
|---|---|---|
| 0381492A3 | 8/1990 | European Pat. Off. . |
| 0 489 972 A1 | 6/1992 | European Pat. Off. . |
| 0 618 081 | 10/1994 | European Pat. Off. . |

*Primary Examiner*—Benjamin R. Fuller
*Assistant Examiner*—Raquel Yvetle Gordon
*Attorney, Agent, or Firm*—Frishauf, Holtz, Goodman, Langer & Chick, P.C.

[57] ABSTRACT

Disclosed is a method for forming an image in a recording material and transferring said image from said recording material to an image receiving material in order to produce a transferred image in said image receiving material, comprising the steps of: exposing said recording material, wherein said recording material comprises a support, a colorant layer containing a colorant, and a colorant barrier layer containing a light-absorbable substance in this order, said exposing causes to produce an ablated hole in said colorant barrier layer to form said image and said exposing is held with controlling means for exposing said recording material based on an image signal so that a size of said ablated hole in said colorant barrier layer is subject to change based on said image signal, said exposing means producing a light which is absorbed by said light-absorbable substance; and transferring said colorant from said colorant layer to said image receiving material through said ablated hole to produce said transferred image in said image receiving material in accordance with said image in said recording material by contacting said colorant barrier layer with an image receiving layer of said image receiving material in the presence of heat or pressure.

10 Claims, 10 Drawing Sheets

80

PROCESS OF FORMING A TRANSFER-IMAGE OF ABLATION TYPE IMAGE-TRANSFER RECORDING MATERIAL

FIELD OF THE INVENTION

This invention relates to an image-transfer type image-recording material capable of providing an image having a high density and a high-gradation, and to a transfer-image recording process in which the above-mentioned image-recording material is used.

BACKGROUND OF THE INVENTION

The conventional transfer-image recording processes have included such a process that a thermal-transfer image-recording material comprising a base member provided thereon with a thermally fusible colorant layer or a colorant layer containing a thermally sublimable dye and an image-receiving material are made opposite to each other, that a heat source, that is controlled by an electric signal such as that sent from a thermal head or an electrified head, is brought into pressure contact from an ink-sheet side (that is the side of the image-recording material), and that an image can be transferred and then recorded.

Japanese Patent Publication Open to Public Inspection (hereinafter referred to JP OPI Publication) Nos. 63-35383/1988 and 63-35387/1988 describe each a technique, wherein; a support is provided thereon with a sublimable ink layer and a protective layer containing a thermoplastic resin as the principal component; the protective layer is ablated by applying an irradiation of laser beam thereto so that the ablated protective layer can be fused; that the protective layer and an image-receiving paper sheet are brought into close contact with each other and heat is applied thereto by a laser or thermal head from the side of the support having the sublimable ink layer; and, thereby that an image information is thermally transferred to the image-receiving layer. In relation to the above-mentioned technique, JP OPI Publication No. 4-201486/1990 discloses a technique in which a vacuum evaporated metal layer is applied to a dye-barrier layer (that is equivalent to the aforementioned protective layer). As for the other techniques, on one hand, U.S. Pat. Nos. 5,156,938 and 5,171,650 describe a technique; that extremely high power-density laser beam is irradiated to an ink layer or to a layer interposed between a support and an ink layer so that the ink layer is exploded; and that, by the explosive power, the ink layer together with a binder are blown off to an image-receiving member so that an image on the ink layer is transferred to the image-receiving member.

In recent medical and printing fields, on the other hand, there have been the demands for a recording system capable of performing an image-processing system having a high resolving power and a high-speed recording performance, that is so-called a digital-recording system. In an image-recording system applied with a digital information, there have been two kinds of the means for obtaining an image having a gradation, namely, a means in which an image is made contrasty by varying an energy necessary for ablating a recording (or a thermal energy in the case of a thermal head), such as a sublimable type image-transfer recording means and a thermally color-development recording means each with the use of a thermal head, and the other means in which an apparent image is made contrasty by varying a pixel area, such as, typically, a dither method. Even in either means mentioned above, it has been impossible to record an image having such a high density and a high gradation as a silver halide photographic light-sensitive material can express.

This invention was invented by taking the above-mentioned circumstances into consideration. It is, therefore, an object of the invention to provide an image-recording process and a recording material each capable of recording an image having a high density and a high gradation and relatively simple in the process.

SUMMARY OF THE INVENTION

The above-mentioned objects of the invention can be achieved in the following process and material;

A method for forming an image in a recording material and transferring said image from said recording material to an image receiving material in order to produce a transferred image in said image receiving material, comprising the steps of:

exposing said recording material, wherein said recording material comprises a support, a colorant layer containing a colorant, and a colorant barrier layer containing a light-absorbable substance in this order, said exposing causes to produce an ablated hole in said colorant barrier layer to form said image and said exposing is held with controlling means for exposing said recording material based on an image signal so that a size of said ablated hole in said colorant barrier layer is subject to change based on said image signal, said exposing means producing a light which is absorbed by said light-absorbable substance; and transferring said colorant from said colorant layer to said image receiving material through said ablated hole to produce said transferred image in said image receiving material in accordance with said image in said recording material by contacting said colorant barrier layer with an image receiving layer of said image receiving material in the presence of heat or pressure.

In the present invention, a recording material is exposed while an exposure means is controlled based on image signals, and thereby, a diameter of an ablated hole formed on a colorant barrier layer can be changed. Therefore, when a pixel is composed of a plurality of dots, for example, it is further possible to control the transferred density corresponding to each dot so that a transferred image having a higher gradation can be obtained, by changing further a diameter of an ablated hole, compared with a conventional image-forming method wherein the gradation is controlled only by changing the number of dots and thereby changing an area of a pixel.

Wherein, the referential numerals indicate the following members;

1 Support for a recording material;
2 Colorant layer;
3,6 Colorant-barrier layer;
4 Support for an image-receiving material;
5 Image-receiving layer;
7 Layer for controlling an amount of colorant to be transferred;
81 Light-emitting element;
83 Raster-image processor;
84 Image-signal processing circuit;
85 Laser-beam source modulation circuit; and
100 Modulation-signal generating means.

DETAILED DESCRIPTION OF THE INVENTION

Figure 1:
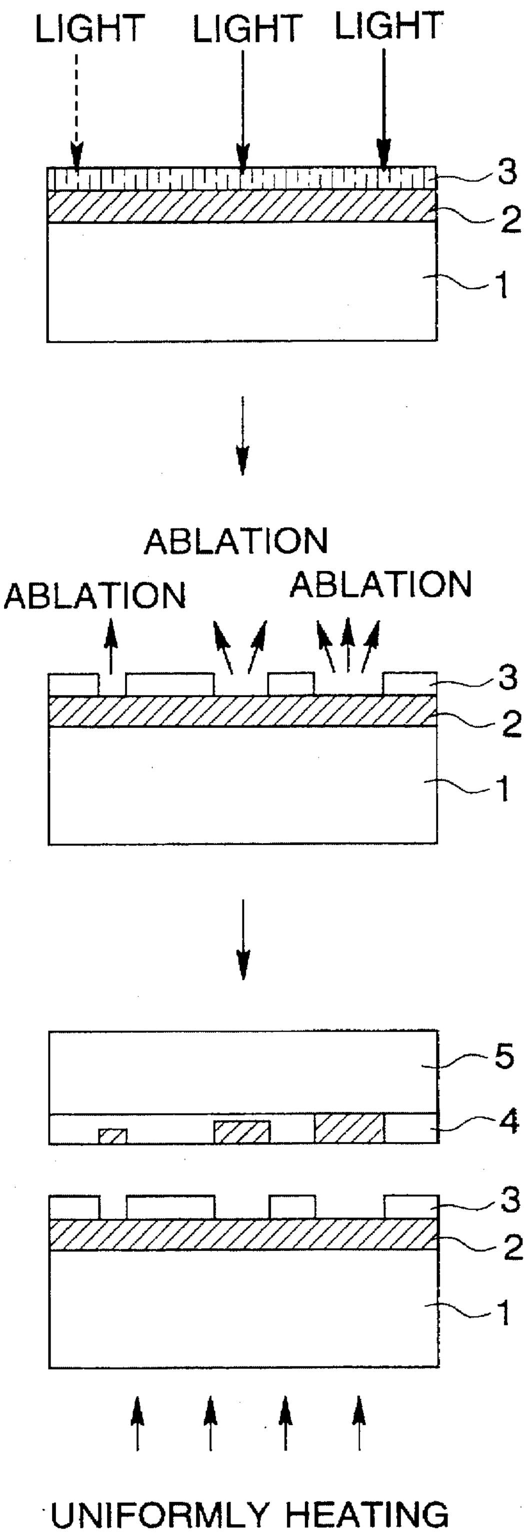
FIG. 1: A diagram showing a time-series process for performing a recording process of the invention.

A thermal-transfer recording material of the invention (hereinafter sometimes simply referred to a recording material of the invention) is basically comprised of a support laminated thereon with colorant layer 2 and colorant-barrier layer 3 in this order, as shown in FIG. 1, for example. If required, the support thereof may also be laminated with a further layer.

The above-mentioned support shall not specially be limitative, provided that the dimensional stability thereof can be excellent and resistive against such a heat source as a laser beam. The supports applicable to the invention include, for example, those made of a thin paper such as condenser paper and a glassine paper, and those made of a heat-resistive plastic-film such as those made of polyethylene terephthalate, polyethylene naphthalate, polyamide, polycarbonate, polysulfone, polyvinyl alcohol, cellophane and polystyrene.

A thickness of the above-mentioned support is usually within the range of, preferably 2 to 200 μm and, more preferably 25 to 100 μm.

In a colorant layer, a binder, besides a colorant, is contained as the inevitable component and, if required, such an optional component as an additive may also be contained.

In the invention, a colorant to be transferred to an image-receiving layer may preferably be a thermally diffusible dye. Without limitation thereto, the colorant may also be other dyes or pigments than the above. When such a colorant is transferred to an image-receiving layer, it is also allowed that the other dye or pigment may assume the form of the so-called thermally fusible type in which the dye or pigment is transferred together with a binder component.

There is no special limitation to such a thermally diffusible dye as mentioned above, provided, the dye is of the thermally diffusible type or of the sublimable type. The thermally diffusible type cyan dyes include, for example, those of the naphthoquinone type, the anthraquinone type or the azomethine type, such as those given in JP OPI Publication Nos. 59-78895/1984, 59-227948/1984, 60-24966/1985, 60-53563/1985, 60-130735/1985, 60-131292/1985, 61-19936/1986, 61-22993/1986, 61-31292/1986, 61-31467/1986, 61-35994/1986, 61-49893/1986, 61-148269/1986, 62-191191/1987, 63-91287/1988, 63-91288/1988 and 63-290793/1988.

The thermally diffusible type magenta dyes include, for example, those of the anthraquinone type, the azo type or the azomethine type, such as those given in JP OPI Publication Nos. 59-78896/1984, 60-30392/1985, 60-30394/1985, 60-253595/1985, 61-262190/1986, 63-5992/1988, 63-205288/1988, 64-159/1989 and 64-63194/1989.

The thermally diffusible type yellow dyes include, for example, those of the methine type, the azo type, the quinophthalone type and the anthraisothiazole type, such as those given in JP OPI Publication Nos. 59-78896/1984, 60-27594/1985, 60-31560/1985, 60-53565/1985, 61-12394/1986 and 63-122594/1988.

The thermally diffusible type dyes suitably applicable thereto also include, for example, an azomethine dye obtained in a coupling reaction of a compound having an open-chained or closed-chained active methylene group with an oxide of a p-phenylene diamine derivative or a p-aminophenol derivative, and an indoaniline dye obtained in a coupling reaction of a phenol derivative and a naphthol derivative with an oxide of a p-phenylene diamine derivative or a p-aminophenol derivative.

When making use of a chelatable, thermally diffusible type dye having the following chemical formula as a dye and containing a metal source capable of reacting with the above-mentioned dye in an image-receiving element, the durability of a dye-image can remarkably be improved even after completing an image-transfer.

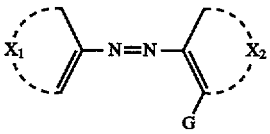

Formula I wherein $X_1$ represents a group consisting of atoms necessary to complete an aromatic carbon ring or heterocyclic ring, among which at least one of the ring is comprised of 5 to 7 atoms and, at the same time, at least one atom adjacent to a carbon atom capable of coupling to an azo-bond is a nitrogen atom or a carbon atom substituted with a chelating group; $X_2$ represents an aromatic heterocyclic ring or an aromatic carbon ring, among which at least one ring is comprised of 5 to 7 atoms; and G represents a chelating group.

In the dye represented by Formula I, further it is preferable to use a dye represented by Formula II to VIII.

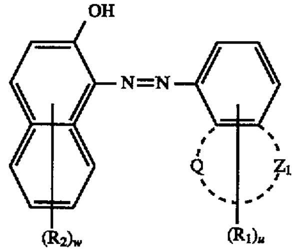

Formula II

In formula II, $Z_1$ is a group of atoms necessary to form a 5- or 6-member heterocyclic ring together with the two carbon atom of the benzene ring and Q; Q is —O—, —S—. —N= or —N(R)—, in which R is a hydrogen atom or an alkyl group; $R_1$ and $R_2$ are each a hydrogen atom or a monovalent group; and u and w are each an integer of 1 to 5.

Formula III

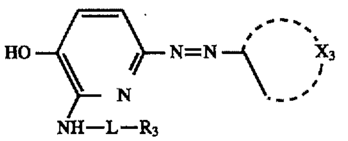

In formula III, L is —CON(R')—, —COO— or —$SO_2$— in which R' is an alkyl group or a hydrogen atom; $X_3$ is a nitrogen-containing heterocyclic ring or an aromatic carbon ring, provided that the atom adjacent to the carbon atom linked to the azo group is a nitrogen atom or a carbon atom having a group capable of forming chelating bond with a metal ion; and $R_3$ is a hydrogen atom. an aliphatic group or a heterocyclic group.

Formula IV

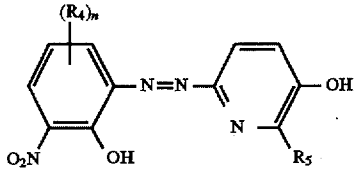

In formula IV, $R_4$ is a substituent; n is an integer of 0 to 3, the plurality of $R_4$s may be the same or different when n is 2 or 3; and $R_5$ is a hydroxyl group or an amino group.

Formula V

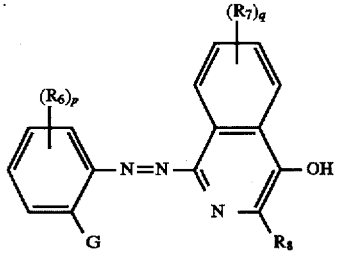

In formula V, $R_6$ and $R_7$ are each a substituent of the benzene ring and the isoquinoline ring, respectively; p and q are each an integer if 0 to 4, when p and q are each 2 or more, the plurality of $R_6$s and $R_7$s may be each the same or different and may link to form a ring, respectively; $R_8$ is a hydrogen atom, a halogen atom or a monovalent substituent; and G is a group capable of forming chelating bond with a metal ion.

Formula VI

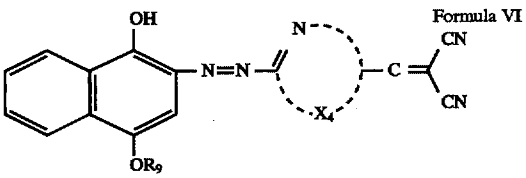

In formula VI, $R_9$ is an alkyl group or a cycloalkyl group; $X_4$ is a group of atoms necessary to form a 5- or 6-member nitrogen-containing heterocyclic ring together with the carbon atom linked with the azo group and the nitrogen atom linked with said carbon atoms; the heterocyclic ring may have a substituent which may form a 9- or 10-member condensed ring.

Formula VII

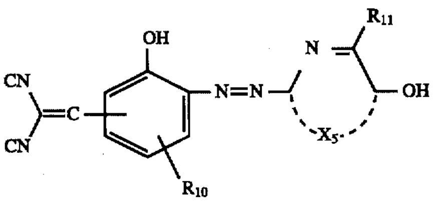

In formula VII, $R_{10}$ and $R_{11}$ is a hydrogen atom or a substituent; $X_5$ is a group of atoms necessary to form a 6-member nitrogen-containing heterocyclic ring together with the carbon atom linked with the azo group and the carbon group linked with the hydroxyl group; the heterocyclic ring may have a substituent which may form a condensed ring.

Formula VIII

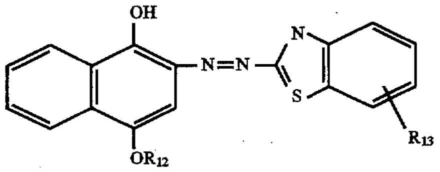

In formula VIII, $R_{12}$ is an alkyl group; and $R_{13}$ is a hydrogen atom or a substituent.

Besides the above, the following dyes can also be used as the above-mentioned chelatable dyes; namely, those given in, for example, JP OPI Publication No. 59-78893/1984, p. 3 and, ibid., 60-2398/1985, pp. 2–5.

When making use of such a chelatable dye as mentioned above in a colorant layer, it is preferable to add a metal source in an image-receiving layer.

The metal sources include, for example, an inorganic or organic salt of a metal ion and a metal complex. Among them, an organic acid salt and the complexes thereof are preferred. The metals include, for example, a mono- or poly-valent metal belonging to groups I to VIII of the periodic table. Among them, Co, Cr, Cu, Fe, Mg, Mn, Mo, Ni, Sn, Ti and Zn are preferable and, inter alia, Ni, Cu, Cr, Co and Zn are particularly preferable. The concrete examples of the metal sources include an aliphatic salt of $Ni^{2+}$, $Cu^{2+}$, $Cr^{2+}$, $Co^{2+}$ or $Zn^{2+}$ and acetic acid or stearic acid, or, a salt of an aromatic carboxylic acid such as benzoic acid or salicylic acid.

A complex represented by the following chemical formula may be particularly preferable to be used.

$$[M(Q_1)_l(Q_2)_m(Q_3)_n]^{p+}(Y^-)_p$$

wherein M represents a metal ion and, preferably, $Ni^{2+}$, $Cu^{2+}$, $Cr^{2+}$, $Co^{2+}$, or $Zn^{2+}$; and $Q_1$, $Q_2$ and $Q_3$ represent each a coordinated compound capable of coordination-bonding to a metal ion, provided that $Q_1$, $Q_2$ and $Q_3$ may be the same with or the different from each other. These coordinated compounds may be selected out of the coordinated compounds given in, for example, "Chelating Chemistry (5)" published by Nanko-Do Book Co.; and, wherein Y represents an organic anion group including, concretely, tetraphenyl boron anion or alkyl benzene sulfonic acid anion; 1 is an integer of 1 to 3; m is an integer of 0 to 2; and n is an integer of 0 or 1, provided that these are determined by whether a complex represented by the above-given chemical formula is coordinated in the 4th position or in the 6th position, or may be determined according to the numbers of the ligands of $Q_1$, $Q_2$ and $Q_3$; and p is an integer of 1 or 2. The concrete examples of the complexes represented by the above-given chemical formula are given in U.S. Pat. No. 4,987,049.

The above-mentioned metal source may be added in an amount within the range of 0.5 to 20 g per sq.meter and, preferably, 1 to 15 g per sq.meter and, in other words, the metal source may be contained in an amount not less than 1.5 mols and, preferably, not less than 3 mols per mol of a chelatable dye content per sq.meter of a colorant layer.

These thermally diffusible type dye is commonly used in an amount within the range of 0.1 to 20 g per sq.meter of a support and, preferably, 0.2 to 5 g. A thermally diffusible type dye content of a colorant layer is commonly within the range of 5 to 70% by weight and, preferably, 30 to 70% by weight.

A binder applicable to a colorant layer include, for example, a resin of which has been well-known in the thermally sensitive image-transfer recording field. As such a binder as mentioned above, a polyvinyl acetal resin and a cellulose resin, of which will be detailed later, are preferred, but there shall be no limitation thereto.

The above-mentioned polyvinyl acetal resins include various kinds of compounds according to an acetalation degree and the contents of an acetyl group, a residual hydroxyl group and so forth. The typical examples thereof include polyvinyl acetal and polyvinyl butyral.

The above-mentioned cellulose type resins include, for example, nitrocellulose, ethyl cellulose, hydroxyethyl cellulose, ethyl hydroxyethyl cellulose, hydroxypropyl cellulose, methyl cellulose, cellulose acetate and cellulose butyrate. Among them, nitrocellulose is preferred.

Besides the above, the resins having been well-known in the thermosensitive image-transfer recording field include, for example, an acrylic resin, a methacrylic resin, polycarbonate, polyvinyl alcohol, polyvinyl formal, polyvinyl ether, polyvinyl pyrrolidone, polystyrene, a polystyrene copolymer and an ionomer resin.

From these binders, one or not less than two kinds thereof may suitably be selected to be used. A binder is preferable to be usually compounded in a proportion within the range of 30 to 70% by weight of the whole colorant layer. In a colorant layer, the weight ratio of a binder to a thermodiffusible type dye is to be within the range of, preferably 1:10 to 10:1 and, more preferably 2:8 to 8:2.

The thickness of a colorant layer may be controlled so that the colorant layer may be peeled off from an image-receiving member and a dye may also be moved by applying a heat energy to the colorant layer. The thickness thereof is usually within the range of 0.2 to 10 μm and, preferably 0.4 to 5 μm.

In the invention, the additives to be added to a colorant layer include, for example, a fluororesin, a surfactant, a wax, a higher aliphatic acid, a higher aliphatic alcohol, a higher aliphatic ether, a fine metal powder, silica gel, carbon black, an organic filler, an inorganic filler and a hardener capable of reacting with a binder component (including, for example, an isocyanate and a radiation-active compound such as acrylic acid and an epoxy), as well as a modified silicone resin. Further, for the purpose of accelerating an image-transfer, a thermofusible type substance such as a higher aliphatic ester given in, for example, JP OPI Publication No. 59-106997/1984 may also be used.

An amount of such an additive as mentioned above to be added thereto may not uniformly be determined so as to meet the kinds and purposes of additives. However, an additive is usually added as a whole in a proportion of not more than 50% by weight of a binder used.

The concrete examples of the above-mentioned modified silicone resins include a polyester-modified silicone resin, an acryl-modified silicone resin, a urethane-modified silicone resin, a cellulose-modified silicone resin, an alkyd-modified silicone resin and an epoxy-modified silicone resin. They may be used independently or in combination.

An amount of a modified silicone resin to be compounded to a colorant layer is usually in a proportion within the range of 0.01 to 10% by weight and, preferably 0.01 to 2.0% by weight to the colorant layer.

A colorant layer may be formed in the following manner. a coating solution is prepared by dissolving or dispersing, in a solvent, the above-mentioned thermodiffusible type dye, a binder and an additive that may be added if required, and the resulting coating solution is coated on a support and then dried up.

Such a binder as mentioned above may not only be used by dissolving them independently or in combination in a solvent, but also be used by latex-dispersing them.

Such a solvent as mentioned above include, for example, an alcohol (such as ethanol, propanol and butanol), a cellosolve, an ester (such as ethyl acetate and butyl acetate), an aromatic substance (such as toluene, xylene and chlorobenzene), a ketone (such as acetone and methylethyl ketone), an ether (such as tetrahydrofuran and dioxane) and a chlorine type solvent (such as chloroform and trichlorethylene). The above-mentioned solvent may be used independently or in combination.

For carrying out the above-mentioned coating process, it is allowed to use a surface-sequential separate-coating process with the use of a gravure-roll, an extrusion-coating process, a wire-bar coating process or a roll-coating process, each of which has generally been known.

A colorant-barrier layer is required to have such a characteristic that any colorant material (or a thermodiffusible type dye) of a colorant layer cannot be permeated through the barrier-layer even if applying heat or pressure, and such a characteristic that the barrier-layer is capable of absorbing a light and an exposed area of the barrier-layer is ablated corresponding to the energy of an exposure. To satisfy the above-mentioned requirements, the raw material of a colorant-barrier is further to satisfy the following requirements; (1) to contain a water-soluble resin, (2) to contain a resin having an ionic bonding, or (3) to contain a resin having a Tg (or a glass-transition point) of not lower than 80° C. and, preferably not lower than 100° C. and, further preferably, to contain a resin having a glass-transition point of not lower than 120° C. as the principal component of the raw material thereof.

The above-mentioned water-soluble resins include, for example, gelatin, a polyvinyl alcohol, a water-soluble polyvinyl formal, a water-soluble polyvinyl acetal, a water-soluble polyvinyl butyral, a polyvinyl pyrrolidone, a water-soluble polyester, a water-soluble Nylon, polyacrylic acid, a water-soluble polyurethane, methyl cellulose and hydroxypropyl cellulose. It is also allowed to use a copolymer of a monomer component constituting the above-mentioned resins.

The above-mentioned resins each having an ion-bond include, besides an ionomer resin, those added with a counter-ion such as $Na^+$, $K^+$, $Ca^{2+}$, $Zn^{2+}$ and $NH_4^+$ to a resin containing a copolymer component such as sulfo group-substituted styrene, acrylic acid, methacrylic acid and phthalic anhydride. It is also preferable to use gelatin or casein.

The resins each having a Tg of not lower than 80° C. include, for example, a polyvinyl chloride, a polyaryl methacrylate, a polybenzyl methacrylate, a polycarbonate, Nylon, a polyphenylene oxide, gelatin and a polyparabanic acid. It is also preferable to use a resin having a Tg of not lower than 80° C., that is, a copolymer of a monomer component such as styrene, vinyl chloride, methyl methacrylate, aryl methacrylate, acrylonitrile, ethylene oxide, benzyl methacrylate and cyclohexyl methacrylate. It is further preferable to use a resin having no glass-transition point, that is, a thermosetting type resin.

The proportion of the raw materials of a colorant barrier to a colorant-barrier layer is preferably within the range of 50 to 99% by weight. Among the whole resin component of a colorant-barrier layer, the proportion occupied by the raw materials of the colorant-barrier layer is preferably not less than 50% by weight, more preferably not less than 70% by weight and, most preferably not less than 90% by weight.

A colorant-barrier layer is also allowed to contain a light-absorbable substance for absorbing a high-intensity exposure light. The light-absorbable substance may also be the above-mentioned resin component itself, provided that the wavelength of the high-intensity exposure light belongs to a spectral region between the UV-ray region and the visual-ray region of not more than 500 nm.

When a high-intensity exposure light wavelength is in a visual-ray region, it is allowed to use a variety of pigments or dyestuffs each capable of absorbing an exposure light having the above-mentioned wavelength. When the wavelength is in a region from a red region to a near-infrared region, it is allowed to use a dye given in JP Application No. 4-334584/1992, or carbon black. For example, from the near-infrared-ray absorbable dyes given in "The functional Materials", June, 1990 issue, pp. 64–68, and the functional dyes for optical-recording use given in "A Colorant", Vol. 61, 1988, pp. 218–223, the following dyes can be selectively used; namely, those of the cyanine type, the squalilium type, the azulenium type, the phthalocyanine type, the naphthalocyanine type, the anthraquinone type, the dithiol metal complex salt type, an indoaniline metal complex salt type, a intermolecular CT complex type, the transition metal chelate type and the aluminum diimmonium type.

When making use of a water-soluble resin as the raw material of a colorant-barrier layer, it is preferable that a light-absorbable substance is also of the water-soluble type. Among them, a tricarbocyanine type dye having a water-soluble substituent such as a sulfo group is particularly preferred.

A light-absorbable substance may be added if occasion demands. When the wavelength of an exposure light is in an infrared region, it is preferable that the aforementioned near-infrared absorbable dye is contained in a proportion within the range of 1 to 50% by weight. A near-infrared absorbable dye may be added in larger amount, provided when the near-infrared absorbable dye may not lower the barrier-function of a colorant-barrier layer.

Besides the above, if required, a colorant-barrier layer may further contain an additive for improving the coatability, such as a surfactant and a conductive compound for an antistatic agent use, a surface lubricant for preventing a blockage and a matting agent.

The thickens of a colorant-barrier layer is preferable to be as thin as possible, provided that the barrier functions thereof shall not be lowered. The thickens thereof is to be within the range of, concretely 0.01 to 2.0 μm and, preferably 0.1 to 1.0 μm; provided, however, that the thickens thereof shall not be limited thereto, because a colorant-barrier layer having a thicker thickness can also be ablated when an exposure light intensity is satisfiably high.

If required, a colorant-barrier layer may be formed of a plurality of layers each separating the functions. In this case, the functions are separated into, for example, a colorant-barrier property, a conductivity, a light absorbency and a blocking resistance. These functions may be assigned separately to a plurality of layers.

A colorant-barrier layer may be coated in the same manner as in the case of the aforementioned colorant layer.

When a layer for controlling an amount of a colorant to be transferred, is provided between a colorant-barrier layer and a colorant layer, the layer for controlling an amount of a colorant to be transferred may have the following structure.

Any layer for controlling an amount of a colorant to be transferred may be used, provided that the subject layer has a functions capable of controlling an amount of a colorant to be transferred so as to meet the thicknesses thereof or the degrees of heat or pressure applied when transferring the colorant. It is, however preferable to use at least one of the following two compositions.

(1) A composition of adding a colorant-permeable type porous raw material to a colorant-barrier type raw material; and (2) A composition of adding a colorant-scavenging type raw material to a colorant-permeable type raw material.

In the composition (1), the above-mentioned materials can be used as the colorant-barrier type raw material, porous fine particles are preferably used as the colorant-permeable porous raw material. The concrete examples of the above-mentioned porous fine particles include carbon black, active carbon, silica gel, calcium carbonate, alumina, barium sulfate, silica, talc, clay, kaolin and activated clay. In particular, carbon black and active carbon are preferable for a raw material capable of suitably making a thermodiffusible dye permeable, because these substances are light-absorbable in themselves.

To a layer for controlling a colorant-transferring amount, a colorant-permeable type porous raw material is added in a proportion within the range of 5 to 60% by weight and, preferably, 10 to 50% by weight. The particle-size of the above-mentioned porous fine particle is preferably within the range of 0.01 to 10 μm and, preferably 0.05 to 1 μm.

A ablation-size of the porous fine particle is to be within the range of 1 to 1000 nm and, preferably 5 to 500 nm.

In the composition (2), a raw material having a solubility parameter of not larger than 9 is preferable for the colorant-permeable type raw material. They include, concretely, a polyethylene, an ethylene-vinyl acetate copolymer, an ethylene-ethyl acrylate copolymer, an ethylene-vinyl alcohol copolymer, a styrene-butadiene copolymer, a styrene-ethylene butadiene copolymer, a styrene-isoprene copolymer, a polybutadiene, a polyisoprene, paraffin wax and ester wax.

As for a colorant-permeable type raw material, a raw material having a solubility parameter of larger than 9 is preferably used. They include, concretely, vinyl chloride, a polyvinyl formal, a polyvinyl acetal, a polyvinyl butyral, a polyester, a polyacrylate, a polyurethane resin, ethyl cellulose, hydroxyethyl cellulose, methyl cellulose, a polyvinyl acetate, phenol resin, a poll;vinyl alcohol and styrene-maleic acid resin.

The above-mentioned solubility parameter is defined, for example, to be one disclosed in Paragraph 7.2 starting on page 268 of Kobunshi Gairon (a revised edition: published on Dec. 10, 1978, by Nikkan Kogyo Shinbunsha).

As for a colorant-scavenging type raw material, it is also allowed to use, without limitation to a resin, a chelating agent capable of fixing a colorant upon making a chelating reaction with the colorant.

Such a chelating agent as mentioned above include, for example, an aliphatic acid salt of $Ni^{2+}$, $Cu^{2+}$, $Cr^{2+}$, $Co^{2+}$ or $Zn^{2+}$ and acetic acid or stearic acid; or a salt of an aromatic carboxylic acid such as benzoic acid and salicylic acid.

A mixture of a colorant-permeable type raw material and a colorant-scavenging type raw material may be dissolved in a solvent, and the resulting solution is then coated and dried up. When a solvent is rich for one of the raw materials and, at the same time, poor for the other, the both raw materials may be mixed up together by dispersing a raw material inferior in solubility to the other.

A proportion of a colorant-permeable type raw material to a colorant-scavenging type raw material is to be within the range of, preferably 5:95 to 95:5 in terms of weight ratio and, more preferably 10:90 to 90:10.

It is preferable that a layer for controlling a colorant-transferring amount additionally contains, besides the aforementioned raw materials, the light-absorbable substances already given in relation to the foregoing colorant-barrier layer. A proportion of adding them is preferably within the range of 1 to 50% by weight to the whole layer for controlling a colorant-transferring amount, without limitation thereto.

When a layer for controlling an amount of a colorant to be transferred, is provided, in addition to the by control of a transferred density corresponding to a diameter of an ablated hole to be formed on a colorant barrier layer, it is further possible to control the transferred density based on the existence of the layer for controlling an amount of a colorant to be transferred, so that a transferred image having higher gradation compared with a recording material having no layer for controlling an amount of a colorant to be transferred, can be obtained.

In the invention, besides a colorant layer and a colorant-barrier layer, any other layer may be provided, if required. For example, a sublayer may be so interposed as to increase a adhesive property between a support and a colorant layer. And, a backing layer may also be provided to the back surface of a support (that is, opposite to a colorant layer) with the purpose of endowing with a running stability, a heat resistance, an antistaticity and so forth. The backing layer thickness is preferably set within the range of 0.1 to 1 μm.

A recording material may also be ablated or marked for detecting a position of a region different in hue from the other regions, so that the recording material can conveniently be used.

Now, an image-receiving material to be used together with a recording material of the invention will be detailed below.

An image-receiving material is comprised of a support and an image-receiving layer. However, an image-receiving material may also be formed of an image-receiving layer that is self-supportable by itself.

The supports include, for example, those made of paper, coated paper, synthetic paper (such as those made of a polypropylene, a polystyrene or a composite material prepared by applying such a synthesized material as given above to paper or plastic film), a white or transparent polyethylene terephthalate film, a white or transparent polyvinyl chloride film, or a polyolefin-coated paper. The thickness of a support is usually within the range of 20 to 300 μm and, preferably, 30 to 200 μm.

An antistatic coating layer is provided to the back surface of a support (that is, opposite to a colovant layer) and the surface resistance of the back surface having an antistatic coating layer, is preferably within the range of $10^{+6}$ to $10^{+12}$ Ω.

An image-receiving layer is formed of a binder for an image-receiving layer use and various additives. The binders for an image-receiving layer use include, for example, a polyvinyl chloride resin, a copolymer resin of vinyl chloride and other monomer (such as alkylvinyl ether and vinyl acetate), a polyester resin, an acrylate, a polyvinyl pyrrolidone, a polycarbonate, cellulose triacetate, styrene acrylate resin, vinyl toluene acrylate resin, a polyurethane resin, a polyamide resin, urea resin, a polycaprolactone resin, styrene-maleic anhydride resin and a polyacrylonitrile resin.

The above-given resins may be used upon newly synthesized. However, those available on the market may also be used. In any case, a resin having a Tg within the range of −20° to 150° C. and, preferably 30° to 120° C. can be advantageously used as a binder for an image-receiving layer use from the viewpoint of the physical properties thereof. It is also preferred when a resin has a weight average molecular weight within the range of 2,000 to 100,000.

When forming an image-receiving layer, the above-mentioned various resins may be cross-linked or hardened with radiation, heat, moisture or a catalyst upon utilizing the reaction active site (to be endowed, if there is no reaction active site.) When this is the case, it is allowed to use a radiation-active monomer such as epoxy and acryl, and a cross-linking agent such as isocyanate.

To an image-receiving layer, a surface lubricant, an antioxidant, a UV absorbent, a photostabilizer, a filler and a pigment may be added. It is also allowed to add thereto a plasticizer, a thermal solvent and so forth as a sensitizer.

An image-receiving layer can be formed in such a coating process that the layer-forming components for the above-mentioned image-receiving layer are dispersed or dissolved in a solvent so as to prepared a coating solution, and the resulting coating solution is coated on the surface of a support and then dried up; or such a lamination process that a mixture having the layer-forming components for an image-receiving layer is fusedly extruded and the resulting extrusion is laminated over the surface of a support.

When taking the above-mentioned lamination process, it is also allowed to use a co-extrusion process, provided when a support is made of a synthetic resin.

An image-receiving layer may be formed extending over the whole surface of a support, or may also be formed a part of the surface of the support.

The thickness of an image-receiving layer is to be within the range of, generally, 1 to 50 μm and, of the order of, preferably, 2 to 10 μm. On the other hand, when an image-receiving layer, that is self-supportable by itself, forms an image-receiving layer, the thickness of the image-receiving layer is to be within the range of, usually, 60 to 200 μm and, of the order of, preferably, 90 to 150 μm.

On the surface of an image-receiving material, it is allowed to laminate an over-coat layer with the purposes of preventing a fusion, improving an image preservability and so forth. The over-coat layer may be formed in a gravure-coating process, a wire-bar coating process, a roll-coating process, other well-known coating processes, a lamination process or the like processes. The thickness of the over-coat layer is to be within the range of, usually, 0.05 to 3 μm.

When an image-receiving material is comprised of a support and an image-receiving layer, a cushion layer may also be interposed between the support and the image-receiving layer, for the purposes of reducing noises and recording an transferred image having an excellent image-reproduction so as to correspond to an original image-information.

The materials for constituting a cushion layer include, for example, urethane resin, acrylic resin, an ethylene type resin, expoxy resin and butadiene rubber. The thickness of the cushion layer is preferable to be within the range of 5 to 25 μm.

Now, a thermal-transfer image-recording process of the invention will be detailed below.

Figure 2:
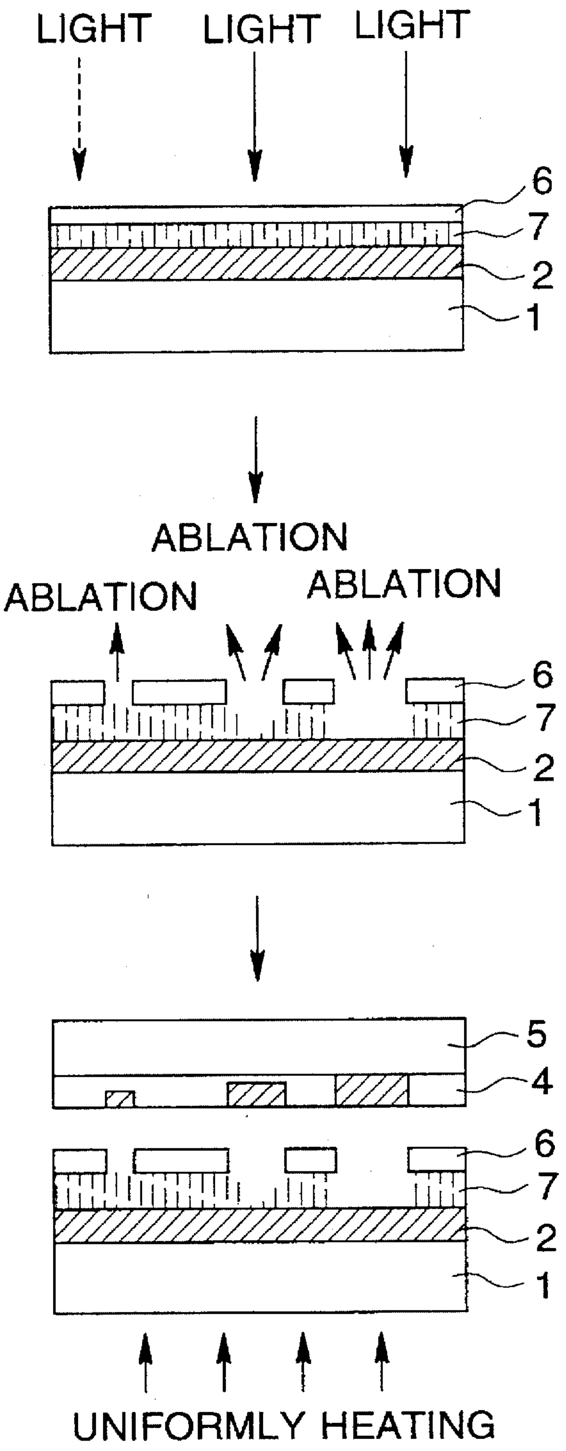
FIG. 2: A diagram showing a time-series process for performing a recording process of the invention when making use of a recording material of the invention.

As shown in FIGS. 1 and 2, the process of forming an image is comprised of a step in which a recording material is exposed to a high intensity light, preferably, from a colorant-barrier layer side and, thereby, the colorant-barrier layer is ablated imagewise first, and another step in which the ablated recording material and an image-receiving material are laid one upon another so that the colorant-barrier layer of the former can be opposed to the image-receiving layer of the latter, and heat or pressure is then applied to the whole surface thereof.

The above-mentioned exposure means will further be detailed. It is preferable that the above-mentioned high-intensity exposure light-source is capable of emitting the rays of light having a wavelength readily condensable through an optical system and having such a high output-energy that it can readily be converted into heat. Such a light-sources as mentioned above include, for example, Xenon rays, halogen rays, semiconductive laser beam, LED rays, helium-neon laser beam, argon laser beam, YAG laser beam and carbon dioxide gas laser beam. Among them, the light-sources readily serviceable as an array comprising plural light-emitting elements include, for example, a semiconductive laser beam and a LED rays.

The light-emitting elements include, preferably, those capable of emitting the rays of light having a wavelength capable of effectively converting an exposure energy into a heat energy. The preferable light-emitting wavelength is to be within the range of, for example, 600 to 2000 nm.

When a semiconductive laser is used, an automatic output-power control (APC) system or an automatic electric-current control (ACC) system may be used as a light-source driving system. In either cases, it is preferable to provide a protective circuit thereto so that a semiconductive laser may not be damaged by a temporarily excessive current.

If required, a plurality of light-sources may be arranged to be a parallel circuit. When this is the case, it is preferable to arrange the exposure system thereof so that every light-source may scan the different scanning lines, and the numbers of the light-source channels are preferably not less than one, but not more than 100.

Figure 8:
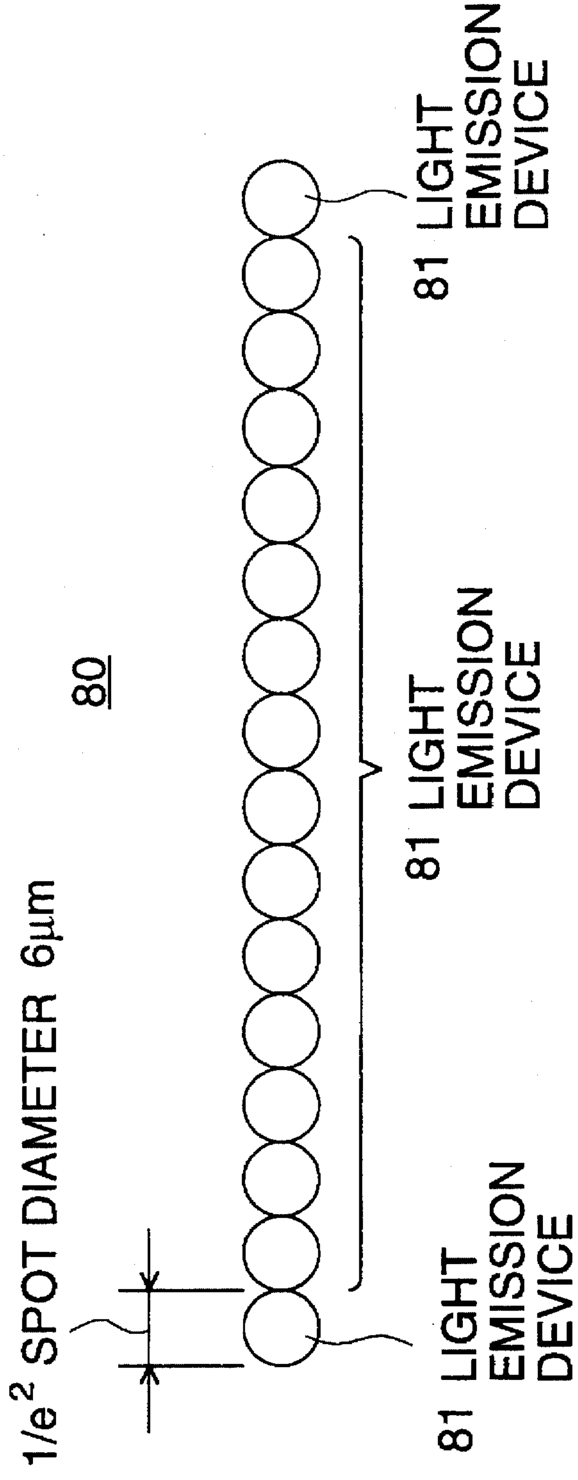
FIG. 8: An example of the arrangement of the light-emitting elements of a light-source.
Figure 9:
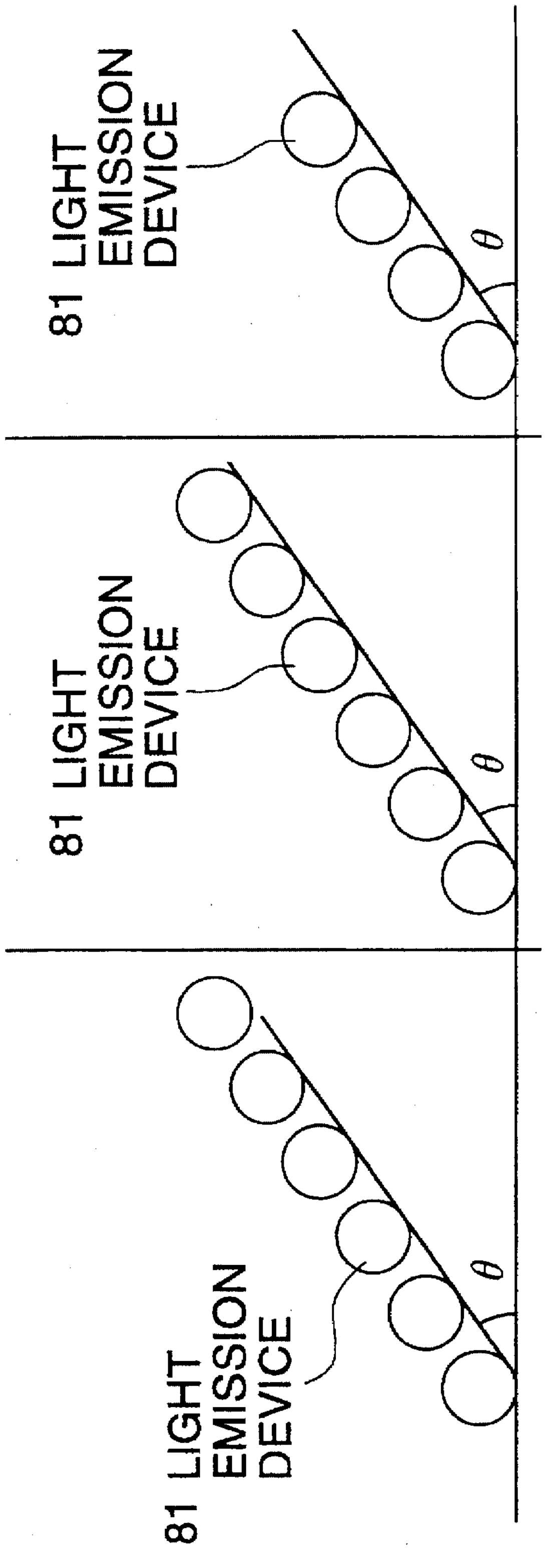
FIG. 9: Another example of the arrangement of the light-emitting elements of a light-source.

FIGS. 8 and 9 illustrate each an example of the arrangement of the light-emitting elements as a light-source for recording a heat-mode, respectively. In FIG. 8, there used the arrays of the light-emitting elements so arranged as to be in 16 rows. In FIG. 9, there were so arranged that the light-emitting element arrays were fell into groups of 6, 6 and 4 pieces of light-emitting elements totaling 16 elements, that each of the arrays was arranged slantwise with a specific angle θ, and that, for example, the semiconductive lasers having the same rated output of 100 mW were used as the light-emitting elements, respectively.

In each of the light-emitting element arrays, the exposure-spot sizes of the individual light-emitting elements are so basically determined as to meet the image resolving power to be required. For example, the spot size of $1/e^2$ is preferably within the range of 3 to 40 μm. For example, in gradation with the light-emitting elements each having a size of not smaller than 1 mm, the spot-sizes in an area subject to be exposed to light are within the range of, for example, 3 to 40 μm. Therefore, the exposure direction of a light-emitting element arranged to a further out-side is to be diffracted more toward the inner side. However, if the exposure direction thereof is diffracted too much, it would not be preferable, because the spot-sizes thereof may be distorted. For relieving as much as possible such a disadvantage that the above-mentioned light-emitting element sizes restrict the arrangements of the arrays, it is preferable to arrange the light-emitting elements in the arrays as shown in FIG. 9.

In such a laser-ablation type recording, an energy-loss, that may be produced by a heat-conduction from a colorant-barrier layer to a colorant layer, can be reduced by shortening an exposure-time. As compared to an ordinary type heat-transfer recording operation, in which an ink layer is heated from a support side by a heat-conduction, the above-mentioned laser-ablation type recording operation can give a heat energy directly to the neighborhood of a colorant-barrier layer.

It is therefore, preferable to make an exposure with the highest possible intensity light and for the shortest possible time. An exposure speed is to be, preferably, not slower than 1 m/second and, more preferably, not slower than 3 m/second in terms of a linear speed. An exposure power density is to be, preferably, not less than 100,000 $W/cm^2$ and, more preferably, not less than 200,000 $W/cm^2$.

The semiconductive laser scanning methods include, for example, the so-called plane-scanning method in which the horizontal scanning is made by a laser beam upon combining a polygonal mirror or a galvanomirror with an fθ lens or the like, and the vertical scanning is made by moving a recording medium, and the so-called cylinder-scanning method in which an exposure is made to a laser beam while rotating a drum, and the horizontal scanning is made by the rotation of the drum and the vertical scanning is made by moving the laser-beam. The latter method is more suitable to a high-density recording, because the accuracy of the optical system can readily be increased.

For making efficient use of the features of a laser-ablation recording, it is preferable to make the dot-pitch thereof narrower than in an ordinary thermal-head. The dot-pitch thereof is to be within the range of not narrower than 2.5 μm to not wider than 25.4 μm and, preferably, not narrower than 3 μm to not wider than 12.7 μm. It is also preferable that the dot-pitch in the horizontal scanning direction and that in the vertical scanning direction are to be agreed with each other.

Figure 3:
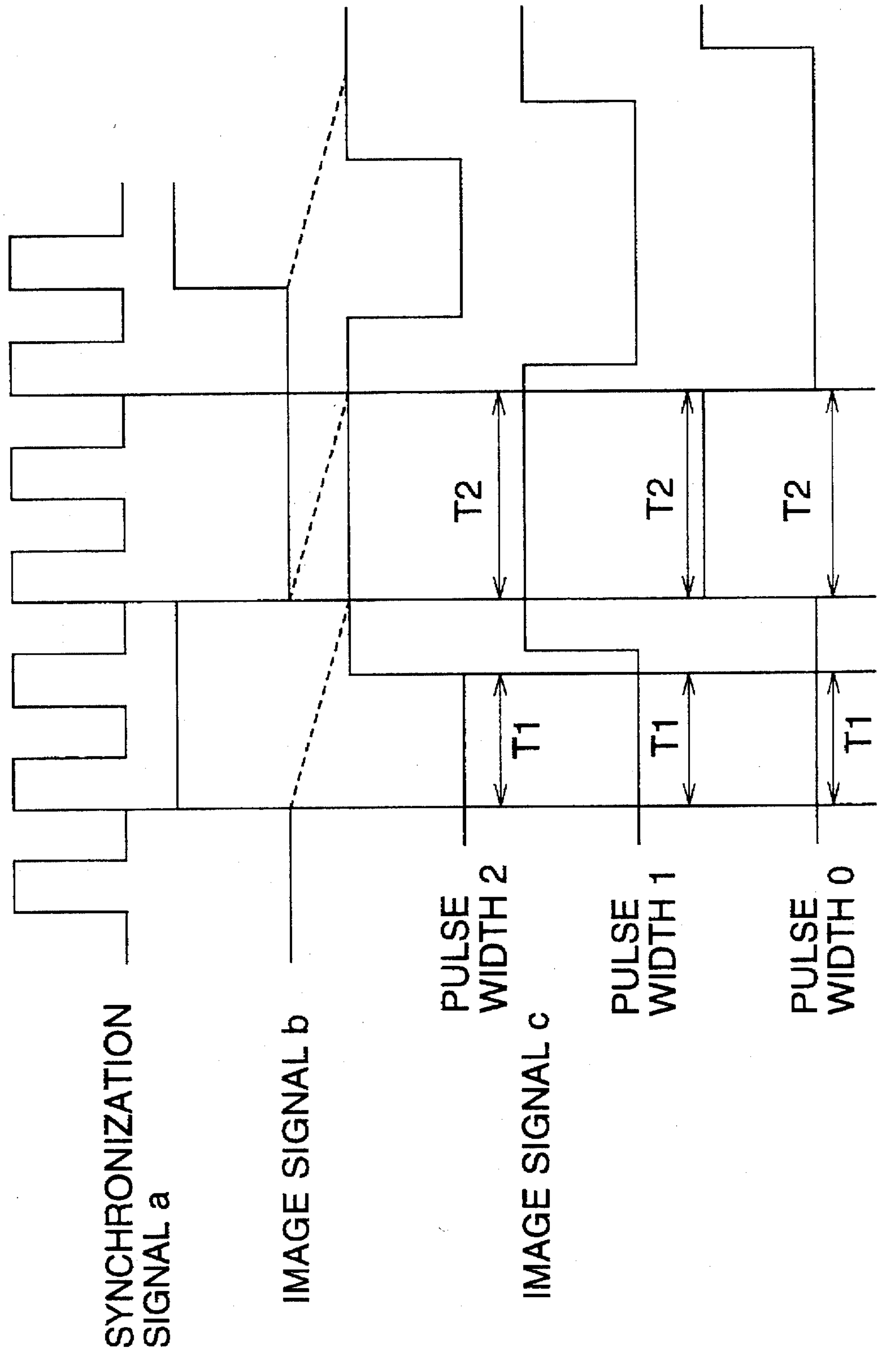
FIG. 3: A timing-chart of an image signal when controlling an exposure energy in the horizontal scanning direction.
Figure 4:
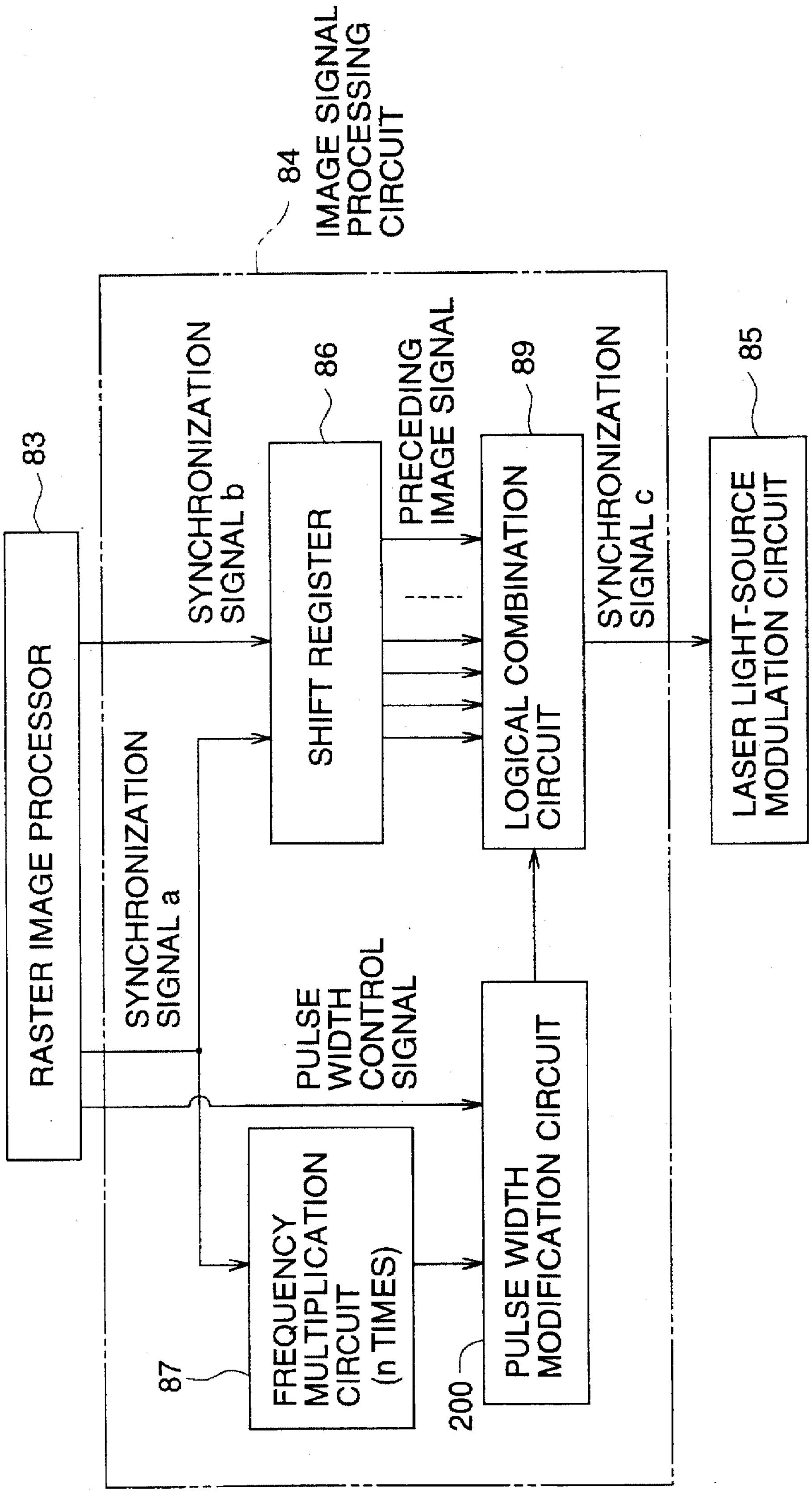
FIG. 4: A block-diagram showing an image-signal processing circuit.

With an exposure-control means, the pulse duration, irradiation intensity and pulse number of laser beam applicable to perforate the dots will not be detailed, according to FIGS. 3 and 4.

In the present invention, the energy for the exposure (for example, a pulse width of a laser beam, an irradiation intensity of a laser beam or a pulse number of a laser beam) is controlled, so that a diameter of an ablated hole formed on a colorant barrier layer can be changed.

FIGS. 3 and 4 show each an example of a control means. FIG. 4 is a block-diagram of an image-signal processing circuit, and FIG. 3 is a timing-chart of an image-signal in the case of controlling an exposure-energy in the horizontal scanning direction.

The example is provided with a variable pulse-duration circuit 200 that is to send a pulse-duration set a specific time T1 after image-signal b is ON or a pulse-duration set a specific time T2 after image-signal b is OFF, from a raster-image processor 83 to a combination circuit 89.

In the combination circuit 89, an image signal c shown in FIG. 3 is obtained upon receipt of an image-signal b from shift-register 86 and an image-signal from variable pulse-duration circuit 200. The image-signal c is then sent to laser light-source modulation circuit 85 so that the laser light-source is controlled by the modulation made in the laser light-source modulation circuit 85.

A pulse-duration control signal is input from raster-image processor 83 to the variable pulse-duration circuit 200. A pulse-duration output from variable pulse-duration circuit 200 can be controlled by the pulse-duration control signal. Thereby, an image signal c is output from combination circuit 89 as shown in FIG. 3, and the output image-signal c is then sent to laser light-source modulation circuit 85, so that the laser light-source can be controlled by the modulation in the laser light-source modulation circuit 85. As described above, control means 82 is provided with a mechanism capable of varying the pulse duration for an exposure.

Figure 5:
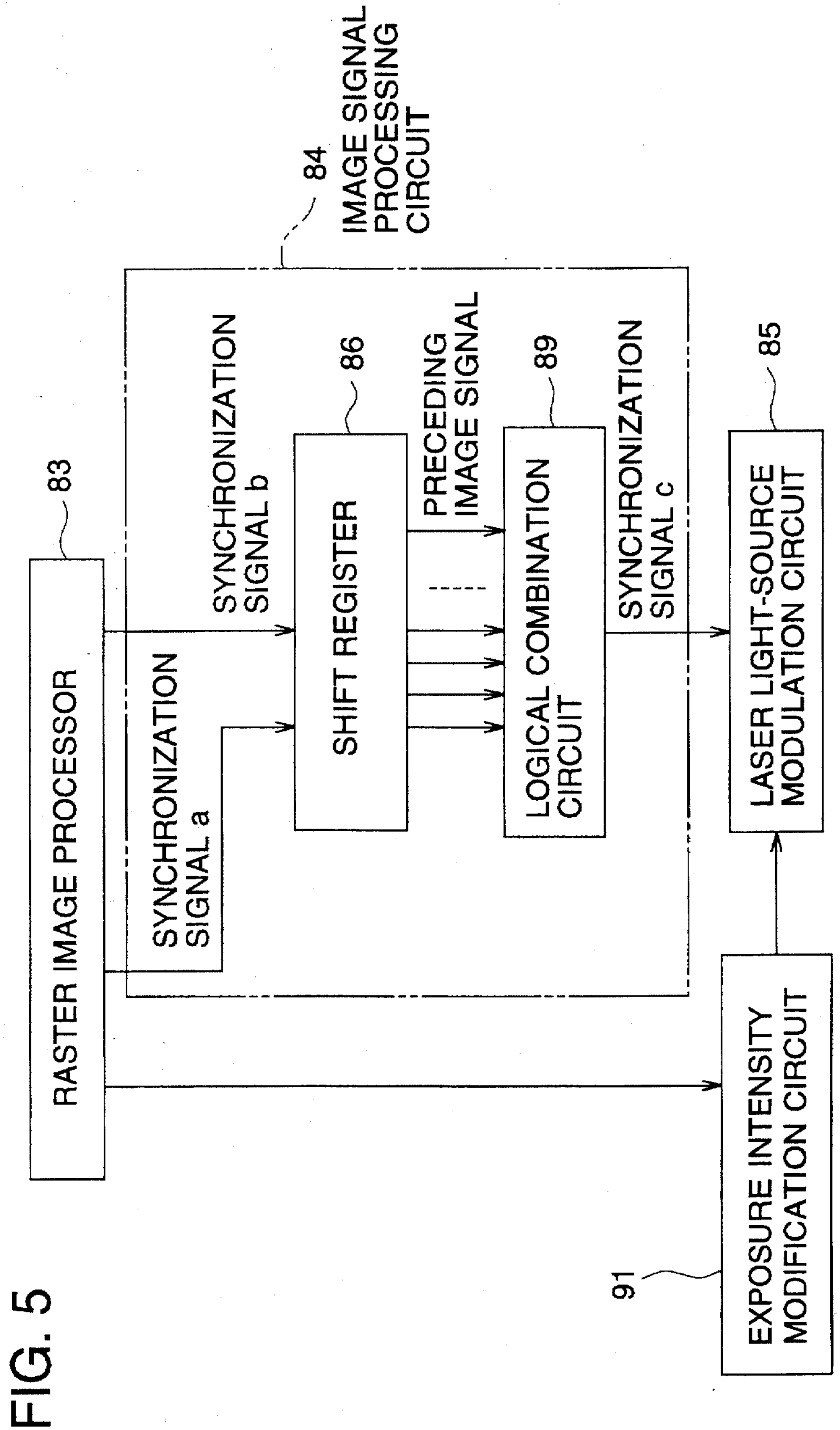
FIG. 5: Another block-diagram showing an image-signal processing circuit.
Figure 6:
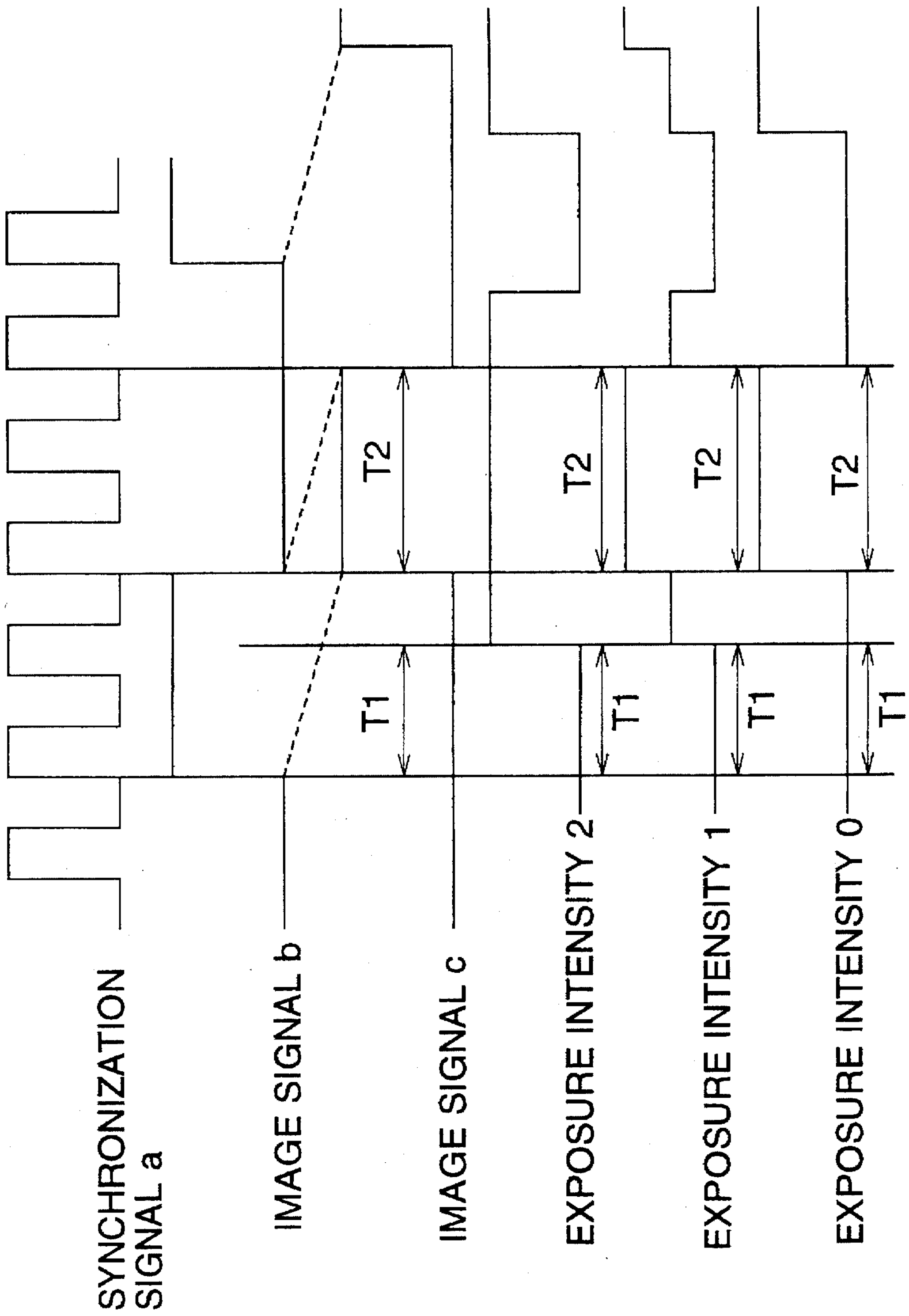
FIG. 6: Another timing-chart of an image signal.

FIGS. 5 and 6 show each other example of the control means. FIG. 5 is a block diagram of an image signal processing circuit; and FIG. 6 is a timing chart of an image signal in the case of controlling an exposure energy in the horizontal scanning direction.

To this example, a variable exposure-intensity circuit 201 is provided. The variable exposure light-intensity circuit 201 is so arranged to vary an exposure-light intensity set a specific time T1 after switching ON an image-signal b sent from a raster-image processor 83 or an exposure-light intensity set a specific time T2 after switching OFF the image-signal b. As described above, a control means 82 is provided with a mechanism capable of varying an exposure-intensity.

Figure 7:
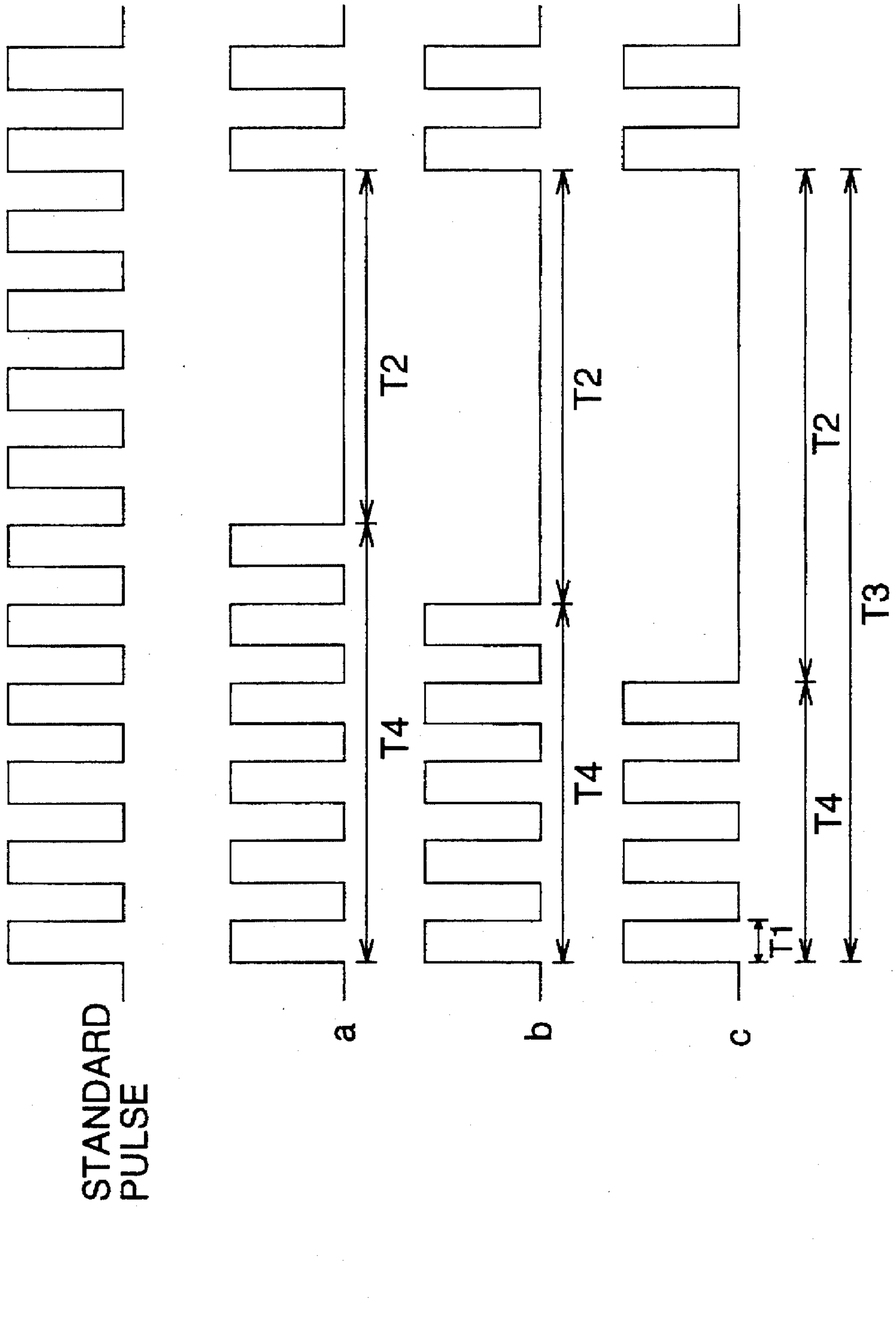
FIG. 7: A timing-chart of an image signal in the case of varying the numbers of pulses having the same pulse duration.

FIG. 7 is similarly a timing chart of an image-signal in the case of varying a pulse number having the same pulse-duration.

Figure 10:
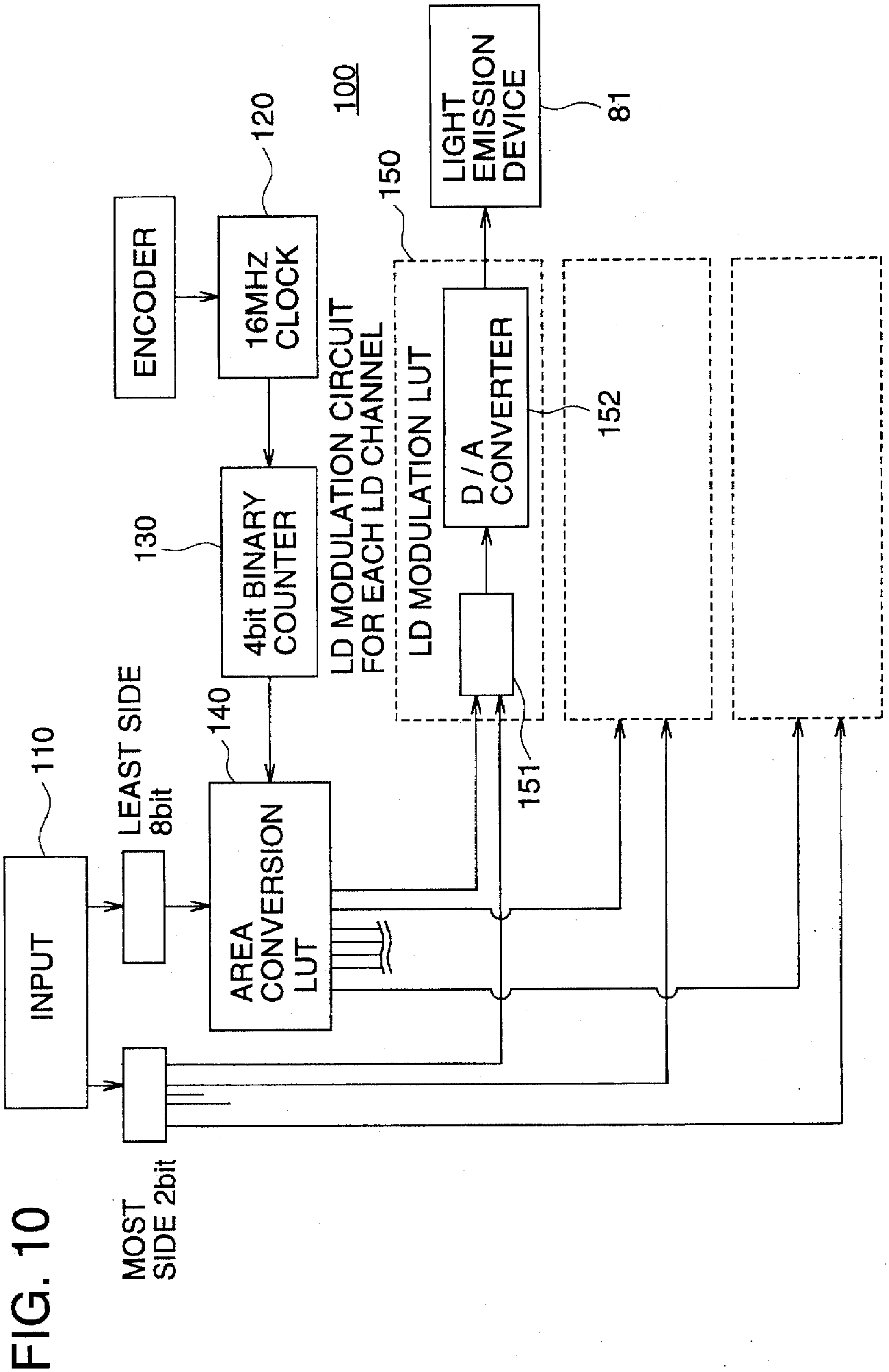
FIG. 10: A block-diagram showing a control means.

Concerning an image-exposure control means for simultaneously controlling an exposure light-intensity modulation to be given to each dot and an area-modulation to be given to each picture-element, the descriptions thereof will now be made according to FIG. 10 that is a block diagram of a control means.

A read-only memory for signal-transformation use (or a ROM) is hereinafter called a look-up table (or abbreviated to as LUT).

Modulation-signal generation means 100 comprises input LUT 110, clock-generation means 120, clock-counter 130, area-modulation LUT 140 and circuit 150 for modulation by LD channels. The circuit 150 comprises LD-modulation LUT 151 and D/A converter 152. An image data is modulation-corrected by input LUT 110 so as to transform the data into 10-bit data. The upper 2 bits of the data 115 are divided into 16 portions so as to be input to the circuit 150 for modulation by LD channels. The lower 8 bits thereof are input to area-modulation LUT 140. A clock is produced by clock-generation means 120 so as to correspond to a writing period of finer picture-elements. According thereto, code 135 capable of displaying an integer from 0 to 15 is repeatedly produced by clock-counter 130, so as to input the code to area-modulation LUT 140. According to the lower 8 bits of data 115 and code 135, the area-modulation LUT 140 produces 16-bit area-modulation data 145 corresponding one to one to 16 LDs. Every bit of the resulting data is then separately input to the circuit 150 for modulation by LD channels. The circuit 150 for modulation by LD channels receives the upper 2 bits of the data 115 and 1 bit of area-modulation data 145 so as to generate an analog voltage signal for modulating the LD. The circuit 150 for modulation by LD channels comprises LD-modulation LUT 151 and D/A converter 152. LD-modulation LUT 151 produces 120 bit LD-driving code 155, according to the upper 2-bits of data 115 and 1 bit of area-modulation data 145. D/A converter 152 generates an analog voltage signal 156 according to LD-driving code 155.

In this way, a pulse width of an exposure, an irradiation of an exposure or a pulse number of an exposure is changed, so that a diameter of an ablated hole formed on a colorant barrier layer, can be changed, as shown in FIG. 1 and it is possible to control an amount of dye to be transferred on an image-receiving layer through the ablated hole. As a result, the gradation corresponding to each dot forming a pixel, can be obtained.

When an image is formed by a signal mixing the resulting area-modulation with a direct-tone reproduced by density (or a variation of laser-beam intensity), an having a 10-bit tone can be obtained as a whole.

Further, an original image data may be of an analog signal or a digital signal.

A ablation formed by applying a high-intensity exposure-light may be of the half-tone dot type or of the continuous ablation type.

When a recording material and an image-receiving material are laid one upon another and then the whole surface thereof is heated, the heat energy may be applied from the image-receiving material side, from the recording material side or from the both sides thereof. When applying the heat, the heat-diffusible type dye of a colorant layer is diffusely transferred from the colorant layer to an image-receiving layer of the image-receiving material through the aforementioned ablations of a colorant-barrier layer, so that an image can be formed. There shall not specially be limited to the heating temperatures, but it is, generally, within the range of, preferably, 60° to 200° C. and, more preferably, 80° to 150° C.

Further, a pressure for transfer is preferably with in the range of 0.1 $kg/cm^2$ to 5 $kg/cm^2$.

In the above-mentioned case, the image can be so formed as to correspond to the configuration of the ablation of the colorant-barrier layer, so that the resulting image may be of the halftone dot type or of the solid-density type. In the case of a halftone-dot type, the more the halftone dot numbers are, the higher the resulting image density is. (The image-density is so increased as to correspond to the ablation numbers.)

A recording material of the invention is provided with a colorant-barrier layer to the top of a colorant layer. It is, therefore, excellent in preservability.

A thermal-transfer recording process of the invention has such a capability that a recording with a high resolving power can be performed by applying a laser beam to the ablation of the above-mentioned colorant-barrier layer; that an extremely wide range of the density-gradation gradation of an image can be expressed by providing each recording dot with a further gradation so that an area-modulation and a density-gradation gradation can be combined; and that a dye is accelerated to be diffused to an image-receiving material by applying heat with a high calorie or by applying a pressure, so that an image density can remarkably be increased.

EXAMPLES

Now, the invention will concretely be detailed with reference to the examples thereof. However, the embodiments of the invention shall not be limited thereto. The expression, a "part", shall hereinafter be referred to as a "part by weight" The chemical structures of the infrared-absorbable dyes and the chelate-formable dyes will be shown below. In the following examples, every density was measured through a Sakura Densitometer, Model PDA-65, (manufactured by Konica Corp.) and, unless otherwise especially indicated, a green filter was also used when the measurements were made.

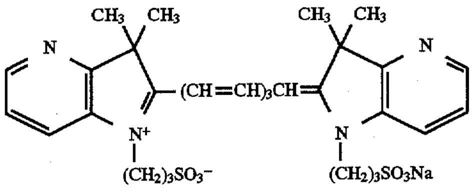
IR-1
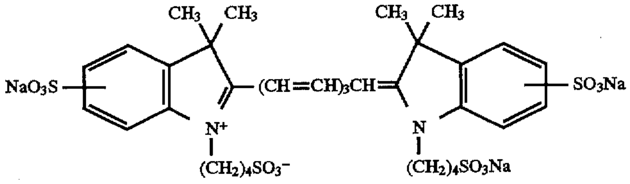
IR-2
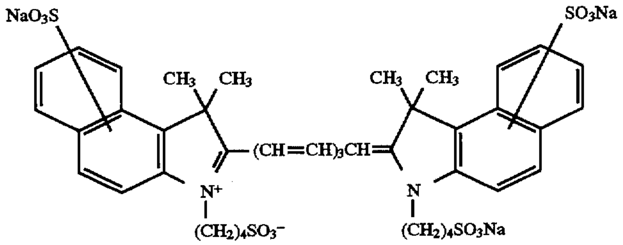
IR-3
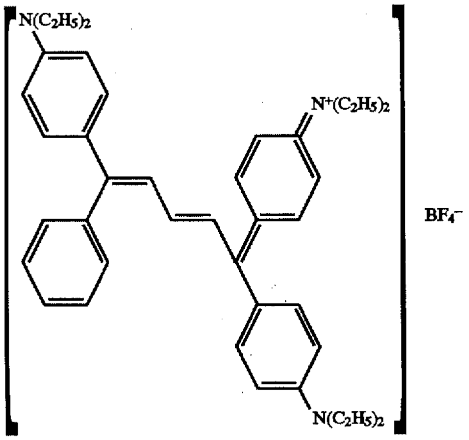
IR-4
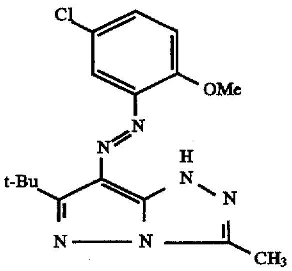
D-1
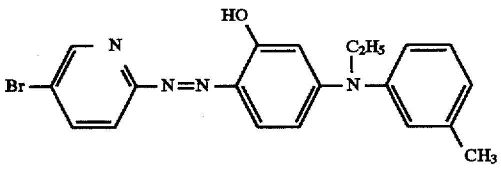
D-2

-continued

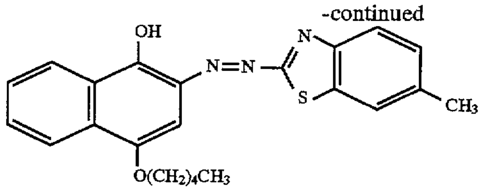

D-3

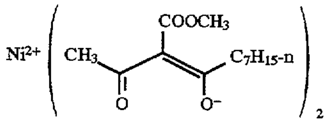

D-4

Example 1

(Preparation of a recording material)

The following compositions were mixed and dispersed, so that a colorant layer coating solution containing a thermally diffusible dye could be prepared.

| Colorant layer coating solution | |
|---|---|
| Thermally diffusible dye, (Kayaset-Blue 714 manufactured by Nihon-Kayaku Co.) | 4 parts |
| Polyvinyl butyral resin, (Eslec BX-1 manufactured by Sekisui Chemical Co.) | 4 parts |
| Methyl ethyl ketone | 90 parts |
| Cyclohexanone | 10 parts |

The above-mentioned colorant layer coating solution was coated on a 100 μm-thick polyethylene terephthalate (PET) film by making use of a wire-bar and was then dried up, so that a 4 μm-thick colorant layer could be formed. On the back side of the PET film, a nitrocellulose layer containing silicone-modified urethane resin (SP-2105 manufactured by Dai-Nichi Seika Co.) was arranged as a backing layer.

A colorant-barrier layer having the following composition was coated on the above-mentioned colorant layer by making use of a wire-bar, and was then dried up to form a 0.5 μm-thick colorant-barrier layer, so that a recording material could be obtained.

| Composition of colorant-barrier layer | |
|---|---|
| Gelatin | 3.5 parts |
| Near-infrared absorbable dye (IR-1) | 1.5 parts |
| Pure water | 95 parts |

(Preparation of image-receiving material)

On a 150 μm-thick synthetic paper sheet (Yupo FPG-150 manufactured by Oji Yuka Synthetic Paper Co.), a coating solution for forming an image-receiving layer having the following composition was coated by making use of a wire-bar and was then preliminarily dried by making use of a drier. Thereafter, the resulting coated paper sheet was dried for one hour in an oven having been kept at 100° C. so that a 5 μm-thick image-receiving layer could be provided to the top of the synthetic paper sheet and, thereby, an image-receiving material could be obtained.

| Coating solution for forming an image-receiving layer | |
|---|---|
| A vinyl chloride-vinyl isobutyl ether copolymer, (Ralloflex MP25 manufactured by BASF AG.) | 9 parts |
| Polyester-modified silicone resin (X-24-8300 manufactured by Shin-Etsu Silicone Co.) | 1 part |
| Methyl ethyl ketone | 40 parts |
| Cyclohexanone | 10 parts |

(image formation)

<Ablation on a colorant-barrier layer>

A laser beam of a semiconductive laser LTO90MD/MF (having a wavelength of 830 nm and the maximum beam output of 100 mW, manufactured by Sharp, Inc.) was condensed on a colorant-barrier layer of the above-mentioned recording material so that the beam could have a diameter of about 6 μm at the maximum output. Thereafter, the colorant-barrier layer was ablated by irradiating the resulting beam with a scanning pitch of 10 μm and a scanning speed of 2 m/sec. (at that time, the optical efficiency thereof was 60%). When ablating the colorant-barrier layer, the source of the electric current applied to the semiconductive laser was so controlled as to vary the power on an exposure plane from 10 mW to 60 mW and, thereby, the diameters of the dot were controlled to be 4 levels, namely, 2 μm, 4 μm, 6 μm and 8 μm, respectively.

<Colorant transfer>

As described above, the recording material having a ablated colorant-barrier layer and the image-receiving material were laid one upon another so as to bring the colorant-barrier layer into contact with the image-receiving layer, and were then transported through heat rolls capable of applying heat at 120° C. and pressure in a ratio of 2 kg/cm$^2$, so that only the ablated portions of the colorant (that was a diffusible dye) could be transferred to the image-receiving layer.

In a solid-density transferred portion comprising dots each having a diameter of 8 μm, the red reflection-density thereof (in solid density) was measured and it was proved to be 3.1. In the portions comprising dots having the diameters of 2 μm, 4 μm and 6 μm, the red reflection-densities thereof were proved to be 0.8, 1.7 and 2.5, respectively. In the portions remaining unablated, the reflection-density thereof (that was the white background density thereof) was proved to be 0.06, and there was no difference from the reflection density of the image-receiving material before it was transported through the heat rolls.

Example 2

A colorant layer and a colorant-barrier layer are prepared in the same manner as shown in Example 1, a layer for controlling an amount of the colorant to be transferred, was provided between the colorant layer and the colorant-barrier layer, and by changing the compositions of the latter layer as shown below. Each of the colorant-barrier layers was set to be 0.2 μm and the thicknesses of the layer for controlling an amount of the colorant to be transferred was set to be 0.6 μm, respectively.

| <Layer for controlling an amount of the colorant to be transferred> | |
|---|---|
| 2-1 | |
| Gelatin | 4 parts |
| Carbon black (having an average particle size of 0.15 μm) | 4 parts |
| Water | 92 parts |
| 2-2 | |
| Water-soluble polyester resin (having an anionic property and pH = 3 to 5; Pes-resin 200, in an aqueous 20% solution, manufactured by Takamatsu Yushi Co.) | 10 parts |
| Near-infrared absorbable dye (IR-2) | 1 part |
| Calcium carbonate (having an average particle size of 0.2 μm) | 9 parts |
| Pure water | 80 parts |
| 2-3 | |
| Styrene-isoprene copolymer, (Calliflex TR1117 manufactured by Shell Chemical. Co.) | 8 parts |
| Near-infrared absorbable dye (IR-4) | 2 parts |
| Nickel stearate | 2 parts |
| Methyl ethyl ketone | 90 parts |

By making use of the above-mentioned recording material and the same image-receiving material as in Example 1, a colorant-barrier layer was ablated and an image was thermally transferred in the same manner as in Example 1, except that the semiconductive laser beam output was set to be 150 mW and the exposure plane power was changed from 20 mW into 100 mW. The results thereof will be shown below.

| Recording | White back- | Density to spot-size (μm) of ablation | | | |
|---|---|---|---|---|---|
| material | ground density | 2 μm | 4 μm | 6 μm | 8 μm |
| 2-1 | 0.06 | 4.50 | 1.30 | 2.20 | 2.90 |
| 2-2 | 0.07 | 6.00 | 1.10 | 2.10 | 3.00 |
| 2-3 | 0.06 | 6.00 | 1.20 | 2.10 | 3.20 |

Example 3

(Preparation of recording material)

A colorant layer coating solution containing a thermally diffusible dye was prepared by mixing and dispersing the following composition.

| Colorant layer coating solution | |
|---|---|
| Chelate type thermally diffusible dye | |
| (D-1) | 25 parts |
| (D-2) | 15 parts |
| (D-3) | 40 parts |
| Polyvinyl butyral resin (Eslec BX-1 manufactured by Sekisui Chemical Co.) | 20 parts |
| Methyl ethyl ketone | 700 parts |
| Cyclohexanone | 200 parts |

The resulting colorant layer coating solution was coated on a 100 μm-thick PET film by making use of a wire-bar and was then dried up, so that a 4 μm-thick colorant layer could be formed.

Next, a colorant-barrier layer composition having the following formula was coated on the above-mentioned colorant layer by making use of a wire-bar and was then dried up so as to form a 0.15 μm-thick colorant-barrier layer, so that a recording material could be obtained.

| Composition for colorant-barrier layer | |
|---|---|
| Gelatin | 2.5 parts |
| Near-infrared absorbable dye (IR-3) | 2.5 parts |
| Pure water | 95 parts |

(Preparation of image-receiving material)

A 100 μm-thick PET film having a surface resistance of $10^{10}$ Ω was subjected to an antistatic treatment on the back surface thereof. An image-receiving layer coating solution having the following composition was coated on the surface of the PET film opposite to the antistatically treated surface thereof by making use of a wire-bar and was then dried at 120° C. for 30 minutes, so that a 4 μm-thick image-receiving layer could be formed.

| Image-receiving layer coating solution | |
|---|---|
| Polyvinyl butyral (Eslec BL-1 manufactured by Sekisui Chemical Co.) | 40 parts |
| Metal source (D-4) | 50 parts |
| Amino-modified silicone (KF-393 manufactured by Shin-Etsu Silicone Co.) | 5 parts |
| Epoxy-modified silicone (X-22-343 manufactured by Shin-Etsu Silicone Co.) | 5 parts |
| Methyl ethyl ketone | 300 parts |
| Cyclohexane | 100 parts |

(Image formation)

<Ablation of colorant-barrier layer>

The colorant-barrier layer of the above-mentioned recording material was exposed to condensed semiconductive laser beam (having a wavelength of 810 nm and the maximum beam output of 150 mW) with a half-width beam-size of 5 μm at the maximum output. A 80×80 μm pixel formed of 16×16 smallest dots was exposed to laser-beam of 10 bit (with 1024 gradation) in such a manner that a laser-beam exposure device was arranged as shown in FIG. 9, that 16 units of semiconductive laser and the circuit shown in FIG. 10 were used, and that the area-modulation and the density gradation of every smallest dot were set to be 8 bit (with 256 gradation) and 2 bit (with 4 gradation), respectively.

When making the exposure, the beam output on the focal plane was 101 mW in average per semiconductive laser unit. When making a solid exposure, the exposure energy density calculated out of the exposure scanning speed was 150 mJ/$cm^2$.

<Colorant transfer>

In a recording material having a ablated colorant-barrier layer, the colorant-barrier layer and the image-receiving layer of an image-receiving material were laid one upon another so as to come into contact with each other, and only the ablated colorant was transferred to the image-receiving layer through the heat rolls capable of applying heat at 180° C. and pressure at 2 kg/$cm^2$.

The image-receiving material, to which the colorant was transferred, could produce thereon a gradation pattern having a gentle density variation corresponding to the 10 bit-gradation. The resulting tone was almost in black or gray. The PET film transmission density, the unexposed area transmission density and the solid exposed area transmission density were 0.02, 0.02 and 3.28, respectively. Further for confirming the preservability of the resulting image, a preservation was tried at 50° C. for one month. The results thereof proved that no image-bleeding was found and an excellent preservability could be displayed, as compared to the reference preserved at room temperature.

Example 4

A recording material was prepared on a 12 μm-thick PET film in the same manner as in Example 3, except that only the formula of the colorant layer was changed as shown below. Thereafter, the following image-receiving material was prepared.

| Colorant layer coating solution | |
|---|---|
| Chelate type thermally diffusible dye | |
| (D-1) | 22 parts |
| (D-2) | 13 parts |
| (D-3) | 35 parts |
| Matting agent (having an average particle size of 17 μm, MR-20G manufactured by Soken Chemical Co.) | 10 parts |
| Polyvinyl butyral resin (Eslec BX-1 manufactured by Sekisui Chemical Co.) | 20 parts |
| Methyl ethyl ketone | 700 parts |
| Cyclohexanone | 200 parts |

(Preparation of image-receiving material)

A 175 μm-thick PET film having a surface resistance of $5\times10^9$ Ω was subjected to an antistatic treatment on the back surface thereof. A cushion layer coating solution having the following composition was coated on the surface of the PET film opposite to the antistatically treated surface thereof by making use of a doctor-blade, so that a 4 μm-dried thick cushion layer could be formed.

| Cushion layer coating solution | |
|---|---|
| Vinyl ethylene acetate resin, (Everflex EV-40Y manufactured by Mitsui-DuPont Polychemical Co.) | 30 parts |
| Toluene | 60 parts |
| Methyl ethyl ketone | 10 parts |

An image-receiving layer coating solution having the following composition was coated, by making use of a wire-bar, on the surface-treating agent coated surface of a 25 μm-thick PET film provided separately with a peelability by treating the film with a silicone surface-treating agent, so that a 3 μm-dried thick image-receiving layer could be formed.

| Image-receiving layer coating solution | |
|---|---|
| Vinyl chloride resin, (TK-300 manufactured by Shin-Etsu Chemical Co.) | 40 parts |
| Metal source (D-4) | 50 parts |
| Amino-modified silicone (KF-393 manufactured by Shin-Etsu Silicone Co.) | 5 parts |
| Epoxy-modified silicone (X-22-343 manufactured by Shin-Etsu Silicone Co.) | 5 parts |
| Methyl ethyl ketone | 300 parts |
| Cyclohexanone | 100 parts |

Next, the surface of the image-receiving layer coated on the 25 μm-thick peelable PET film and the surface of the cushion layer coated on the 175 μm-thick PET film were opposed face to face and were then applied with a pressure of 3 kg/$cm^2$ at room temperature by a laminator, so that the two sheets were pasted together. Thereafter, an image-receiving material comprising a 175 μm-thick PET film bearing thereon the cushion layer and the image-receiving layer in this order could be prepared by peeling off the peelable PET film.

(En bloc processing)

Then, the surface of the barrier layer of the recording material and the surface of the image-receiving layer of the image-receiving material were opposed face to face and were then applied with a pressure of 0.5 kg/$cm^2$ at room temperature by a laminator, so that the recording material and the image-receiving material were integrated into a unit.

(Image formation)

The colorant-barrier layer was ablated in the same manner as in Example 3, except that an exposure is carried out from the support side of an image-receiving material. The materials integrated into a unit was applied by heat at 180° C. and a pressure of 5 kg through the laminator. Thereafter, the both materials were separated apart. On the image-receiving material, there obtained a gradation pattern having a gentle density-gradation corresponding to 10 bit-gradation from the unexposed portion to the solidly exposed portion. The resulting transmission density of the film, the transmission density in the unexposed portion and the transmission density in the solidly exposed portion were 0.04, 0.04 and 3.14, respectively.

Example 5

A colorant layer coating solution containing a thermally diffusible dye was prepared by mixing and dispersing the following composition.

| Colorant layer coating solution | |
|---|---|
| Chelate type thermally diffusible dye | |
| (D-1) | 10 parts |
| (D-2) | 6 parts |
| (D-3) | 24 parts |
| Polyvinyl butyral resin, (Eslec BX-1 manufactured by Sekisui Chemical Co.) | 40 parts |
| Methyl ethyl ketone | 90 parts |
| Cyclohexanone | 10 parts |

The above-mentioned colorant layer coating solution was coated on a 100 μm-thick PET film by making use of a wire-bar and then dried up, so that a 4 μm-thick colorant layer could be formed.

Next, a coating solution for a layer for controlling an amount of the colorant to be transferred was prepared by dispersing the following composition.

| Coating solution for the layer for controlling an amount of the colorant to be transferred | |
|---|---|
| Water-soluble polyester resin, (containing a solid component of 25%), (Plus-coat Z-446 manufactured by Go-Oh Chemical Co.) | 10 parts |
| An aqueous dispersion of carbon black, (containing a solid component of 25%) | 10 parts |
| Water | 30 parts |

The coating solution for a layer for controlling an amount of the colorant to be transferred was coated on the previously prepared colorant layer by making use of a wire-bar, so that the samples 5-1, 5-2, 5-3 and 5-4 were each prepared so as to have the dried thicknesses of the layers for controlling an amount of the colorant to be transferred to be 0.1 μm, 0.2 μm, 0.3 μm and 0.4 μm, respectively.

Then, the colorant-barrier layer having the following composition was coated on each of the colorant layers of the resulting samples by making use of a wire-bar and was then dried so as to form a 0.5 μm-thick colorant-barrier layer, so that the recording materials were prepared, respectively.

| Composition of colorant-barrier layer | |
|---|---|
| Polyvinyl pyrrolidone | 2.0 parts |
| Polyvinyl alcohol | 1.5 parts |
| Near-infrared abosorbable dye (IR-1) | 1.5 parts |
| Pure water | 95 parts |

(Preparation of image-receiving material)

The image-receiving material was prepared in quite the same manner as in Example 3.

(Ablation on colorant-barrier layer)

A laser beam of a semiconductive laser LTO90MD/MF was condensed on a colorant-barrier layer of the above-mentioned recording material so that the beam could have a diameter of 6 μm at the maximum output. Thereafter, the colorant-barrier layer was ablated by irradiating the resulting beam with a scanning pitch of 6 μm and a scanning speed of 2 m/sec. When ablating the colorant-barrier layer, the electric current was so controlled as to set the power on an exposure plane to be 40 mW. In every recording material from 5-1 through 5-4, the ablation line widths on the colorant-barrier layers thereof were 3.5 μm.

(Colorant transfer)

In a recording material having a ablated colorant-barrier layer, the colorant-barrier layer and the image-receiving layer of the image-receiving material were laid one upon another so as to come into contact with each other, and the colorant was transferred through the heat rolls capable of applying heat at 150° C. and pressure at 2 kg/cm$^2$. At that time, the transmission densities of the image-receiving layers of the recording materials 5-1 through 5-4 were 3.1, 2.6, 2.0 and 1.1, respectively. In the recording materials 5-1 through 5-4 of this example, it was microscopically observed that only the colorant-barrier layers thereof were ablated, but every one of the layers for controlling an amount of the colorant to be transferred were least ablated. From the results therefrom, it is proved that the transfer-density may be varied by changing the thickness of the layers for controlling an amount of the colorant to be transferred.

Comparative example 1

A colorant layer coating solution for recording material use was prepared by mixing and dispersing the following composition so that the colorant with the colorant layer could be blasted together to be transferred. The resulting coating solution was coated on an aluminum layer that was vacuum-evaporated on a 100 μm-thick polyester film so as to have a transmission density of 50%.

| Colorant layer coating solution | |
|---|---|
| Carbon black | 8 parts |
| Phenol resin, (Tamanol 510 manufactured by Arakawa Chemical Co.) | 2 parts |
| Methyl ethyl ketone | 40 parts |

As for the image-receiving material, a non-processed polyester film was used as it was.

(Image recording)

The recording material and the image-receiving material were laid one upon another, and the air present between the two materials was deflated so that the materials could be brought into close contact with each other. The back surface of the above-mentioned recording material was exposed to condensed semiconductive laser beam (having a wavelength of 810 nm and the maximum beam output of 150 mW) with a half-width beam-size of 5 μm at the maximum output. When making an exposure, one pixel was set to be a unit displayed by 16×16 dots (i.e., 256 dots in total) each having a spot-size of 5 μm, and an image was formed in terms of 80×80 μm pixel units. The resulting exposure plane power was 101 mW. For an image formation, when making a 256-dot exposure, a 255-dot exposure and a 254-dot exposure, pixels were continuously produced and an exposure of a 2 cm×2 cm area was then made. When measuring the transmission density of the colorant layer transferred to the image-receiving sheet side, it was 3.21 for the 256-dot pattern, 2.48 for the 255-dot pattern and 2.06 for the 254-dot pattern, respectively.

Accordingly, in the case of forming a high-density image, a simple area-modulation treatment was proved that a transfer-density was seriously lowered when only a single dot was made to be non-exposed, so that any gradation could not come out clearly.

Example 6

A colorant was transferred to an image-receiving material by irradiating each of 256, 255 and 254 dot-patterns to a recording material and then a ablation was made, in the same manner as in Comparative example 1, except that, when making an image recording, the recording material disclosed in Example 1 and the image-receiving material disclosed in Example 1, are employed, except that the thickness of the support is 100 μm, and the recording material is not contacted with the image-receiving material under vacuum, and an exposure plane power was varied to be 0, 60, 75 and 90 mW each for one dot in the case of a 255-dot pattern and for two dots in the case of a 254-dot pattern, respectively. The results thereof will be shown below.

| Dot pattern | Exposure-plane power in area varied (in mW) | Transmission density of image-receiving material |
|---|---|---|
| 256 | — | 3.35 |
| 255 | 90 | 3.10 |
| | 75 | 3.01 |
| | 60 | 2.84 |
| | 0 | 2.71 |

-continued

| Dot pattern | Exposure-plane power in area varied (in mW) | Transmission density of image-receiving material |
|---|---|---|
| 254 | 90 | 2.91 |
| | 75 | 2.73 |
| | 60 | 2.61 |
| | 0 | 2.55 |

As is obvious from the above-given results, the process of the invention can provide an image having a beautiful gradation even in a high-density area can be obtained, that is further satisfiable for a transmission density area, because not only one pixel area can be split into minute dots, but also a density can be varied by each dot unit.

What is claimed is:

1. A method for recording an image comprising the steps of:

(a) providing a recording material comprising a support, a colorant layer containing a colorant on the support, and a colorant barrier layer containing a light-absorbable substance on the colorant layer, wherein the colorant barrier layer further contains a resin selected from the group consisting of a water-soluble resin, a resin having an ionic bonding and a resin having a glass-transition point at a temperature not lower than 80° C., (b) image-wise exposing said recording material so as to produce an ablated hole in said colorant barrier layer, said exposing including controlling the size of said ablated hole which is subject to change corresponding to the image, and (c) transferring an amount of said colorant from said colorant layer to an image receiving material through said ablated hole by contacting said colorant barrier layer with an image receiving layer of said image receiving material in the presence of heat or pressure.

2. The method of claim 1, wherein said exposing step comprises exposing the recording material to a laser.

3. The method of claim 2, wherein said controlling of the size of the hole comprises changing a pulse duration of the laser, irradiation intensity of the laser, or the number of pulses of the laser.

4. The method of claim 1, wherein said exposing comprises forming a pixel of said transferred image by a plurality of dots.

5. The method of claim 1, wherein said recording material further comprises a layer for controlling the amount of said colorant to be transferred between said colorant layer and said colorant barrier layer.

6. The method of claim 5, wherein said layer for controlling the amount of said colorant layer contains a porous substance.

7. The method of claim 1, wherein said light-absorbable substance is a dye capable of absorbing infrared rays.

8. The method of claim 1, wherein said colorant is a thermally diffusible dye.

9. The method of claim 8, wherein said dye is a chelatable dye and said image receiving layer contains a metal source capable of reacting with said dye.

10. The method of claim 11, wherein said colorant barrier layer contains said water-soluble resin.

* * * * *